(12) United States Patent
Lai

(10) Patent No.: US 12,026,846 B2
(45) Date of Patent: Jul. 2, 2024

(54) LOCATION-BASED METAVERSE SOCIAL SYSTEM COMBINING THE REAL WORLD WITH VIRTUAL WORLDS FOR VIRTUAL REALITY INTERACTION

(71) Applicant: GranDen Corp., Taipei (TW)

(72) Inventor: Ching-Te Lai, Taipei (TW)

(73) Assignee: GranDen Corp., Taipei (TW)

( * ) Notice: Subject to any disclaimer, the term of this patent is extended or adjusted under 35 U.S.C. 154(b) by 86 days.

(21) Appl. No.: 17/978,988

(22) Filed: Nov. 2, 2022

(65) Prior Publication Data
US 2023/0137613 A1    May 4, 2023

(30) Foreign Application Priority Data

Nov. 3, 2021 (TW) ................................. 110140969
Apr. 29, 2022 (TW) ................................. 111116503

(51) Int. Cl.
| | |
|---|---|
| *G06T 19/20* | (2011.01) |
| *G06Q 30/0207* | (2023.01) |
| *G06Q 40/04* | (2012.01) |

(52) U.S. Cl.
CPC ......... *G06T 19/20* (2013.01); *G06Q 30/0207* (2013.01); *G06Q 40/04* (2013.01); *G06T 2219/024* (2013.01); *G06T 2219/2004* (2013.01)

(58) Field of Classification Search
CPC .... G06Q 30/0207; G06Q 40/04; G06T 19/20; G06T 2219/024; G06T 2219/2004
USPC .................................................. 345/419, 633
See application file for complete search history.

(56) References Cited

U.S. PATENT DOCUMENTS

2021/0252384 A1   8/2021   Li et al.

FOREIGN PATENT DOCUMENTS

| CN | 101482900 | 7/2009 |
|---|---|---|
| CN | 108446930 | 8/2018 |
| CN | 108512887 | 9/2018 |
| CN | 109040971 | 11/2020 |
| CN | 112115383 | 12/2020 |
| TW | I467506 | 1/2015 |

OTHER PUBLICATIONS

Hudson-Smith et al., Virtual Cities: Digital Mirrors Into a Recursive World, UCL Centre for Advanced Spatial Analysis. Dec. 2007, pp. 1-25 (with cover page).*

* cited by examiner

Primary Examiner — Jacinta M Crawford
(74) Attorney, Agent, or Firm — Fei-hung Yang

(57) ABSTRACT

A location-based metaverse social media system provided for users to actually move and carry out various social events of online/offline interactions after positioning through a mobile device includes a virtual world management processor and an user processor. The virtual world management processor is provided for augmenting a plurality of parallel virtual worlds by basic map information of the real world and the user processor is provided for the users to create personal accounts and a virtual character tied with them and displayed on the mobile device. In operations, the users can switch to any one of the parallel virtual worlds in a cross-world manner and perform a location-based social event while the users are moving.

23 Claims, 18 Drawing Sheets

LOCATION-BASED METAVERSE SOCIAL SYSTEM COMBINING THE REAL WORLD WITH VIRTUAL WORLDS FOR VIRTUAL REALITY INTERACTION

CROSS-REFERENCE TO RELATED APPLICATIONS

This non-provisional application claims priority under 35 U.S.C. § 119(a) on Patent Application No(s). 110140969 filed in Taiwan, R.O.C. on Nov. 3, 2021, and on Patent Application No(s). 111116503 filed in Taiwan, R.O.C. on Apr. 29, 2022, the entire contents of which are hereby incorporated by reference.

BACKGROUND

Technical Field

The technical field of the present disclosure relates to the concepts of metaverse, location-based service (LBS) and virtual world, and more particularly to a location-based metaverse social system that combines the real world with virtual worlds for virtual reality interaction, and this system is provided for users to actually move to a location and carry out various social events of online/offline interactions after positioning through a mobile device.

Description of Related Art

In location-based service (LBS), the location information (or geographic coordinates) of a mobile end user is obtained through the wireless communication network of a mobile telecommunication company or an external positioning method (such as GPS), to provide a service such as a recharge service to users. The location-based service can be applied to various different areas including health, recreation, work, personal life, etc., and this service can also be used to identify the location of people or objects and provide nearby information, as well as identifying the users' current location in order to send advertising and personalized messages including weather, traffic and activity messages, or even provide localized games to the mobile device. For example, "a method of creating interactive situations in a network environment" as disclosed in R.O.C. Pat. No. 1467506 makes use of the features of the location-based service and considers the distance difference (like the real world) to set the users' power and adjust the game character data accordingly with the relationship between different geographical locations in a game.

Accompanied with the popularity of mobile devices having the network function, the world-famous Pokémon GO was born and introduced to the market on the basis of continuing the development of the location-based service. Pokémon GO is an application game played by a mobile device such as a smartphone and based on the location-based service combined with augmented reality technology. The game is licensed by Nintendo and Pokémon companies, and Niantic, Inc. is responsible for the development and operation of the game and this game has been released on both iOS and Android platforms since July, 2016. While playing the game, players are allowed to use the real world as a platform and further capture, fight, train and trade virtual monsters "Pokémon". During a capture process, the augmented reality function can be enabled in correspondence with the real world. Since the game combines a great deal of location-based services and augmented reality, it brings users an extremely rich and deeply immersive experience, and booms various fields to achieve the augmented reality and the location-based service after the game was released and became popular worldwide.

For example, P.R.C. Pat. No. 108512887 entitled "Retail system based on geographical location AR platform" provides local sales promotion messages based on the users' location to incentivize users to visit the stores in order to increase the sales conversion rate, promote consumption, and confirm the drive traffic effect. In addition, P.R.C. Pat. No. 109040971B entitled "Method and system of implementing outdoor coordination task based on AR and LBS" makes use of augmented reality in a game to set a self-defined treasure chest or golden bean in a specific area or path to incentivize users to go explore and get the corresponding rewards, so as to achieve a good drive traffic effect of the crowd. In addition, P.R.C. Pat. No 108446930A entitled "AR advertising media implementation method" aims at the advertising information of the users' location and compares the information with physical images at the same time to carry out the marketing of advertising media and make the advertising media more interactive and interesting. In addition, P.R.C. Pat No. 112115383A, entitled "Information sharing method based on LBS social platform" attaches geographical location information to various video information uploaded by the users and shares such information on a social platform map in order to share the real-time contents and scenes in real life in the form of real-time videos to the map ecological platform, so that people can know about the realistic situation at other places to achieve the effect of interconnecting information.

Metaverse is used to describe a virtual environment concept created under the Internet, and this synthetic environment contains objects, resident users and their interactions. The concept of metaverse in a broad sense refers not only to the virtual synthetic world, but also to the entire Internet, including the scope of augmented reality. In the related art such as P.R.C. Pat. No. 101482900A, entitled "System and method of controlling groups in a virtual reality application program", users can use their own avatar as an agent in a computer-simulated space, and interact with others socially and economically, and this related art allows users to control the actions of the corresponding virtual avatars and further controls the actions of the avatars of other users in the corresponding group. This related art is a prototype of a simple metaverse concept, but it also illustrates the technical significance that the users can perform various conducts in the environment created in a computer by virtual identity. In fact, this concept was later used and practiced in the aforementioned "Pokémon GO", and a specific implementation of metaverse was shown. For example, the technology of U.S. Pat. No. US20210252384 A1 entitled "Linking real world activities with a parallel reality game" determines whether a client device of a user is situated at a real-world landmark associated with a geographic area, further incentivizes users to travel to the real-world location in the geographic area, and displays virtual elements at a virtual-world location corresponding to the real-world location, such that the location-based service can be used to connect the real-world activities and experience.

Regardless of "metaverse, location-based service (LBS), virtual world, virtual reality, augmented reality, or mixed reality, etc., the related arts are fundamental technologies that have been developed to a considerable extent, and how to create a more practical, convenient, and closely related daily-life invention based on these fundamental technologies is the inspiration of this disclosure. Most users today conduct social events through online social platforms such as Facebook, Twitter, IG, and other social platforms or software with similar performance and functions, and the performance patterns or models of these social tools tend to be consistent, and they have been developed to the limit of functional performance under the framework without more novel imagination and experience. In view of the aforementioned problems, the present discloser based on the technological foundation in the areas of metaverse, location-based service (LBS), virtual world, etc. to conceive an unprecedented social service platform and propose a location-based metaverse social system combining the real world with virtual worlds for virtual reality interaction to users, so that after the positioning by a mobile device, various social events of online/offline interaction and virtual reality integration are carried out with actual mobility, so as to change the old habits and thinking of using social platforms, and create a new business interactive model of online/offline integration.

SUMMARY

It is a primary objective of the present disclosure to provide a new social interaction model which is unlike the traditional electronic bulletin boards, theme boards, discussion threads, and business webpage static information presented as text, and Facebook, IG, etc. presented with social platform or software function, and this social interaction model creates various theme worlds with the concept of universe view in parallel to the virtual world, and then combines the location-based service technology to allow users to conduct cross-world social events with online/offline interaction and virtual reality integration after the positioning by a mobile device.

To achieve the aforementioned and other objectives, this disclosure provides a location-based metaverse social system combining the real world with virtual worlds for virtual reality interaction, which is provided for at least one user to actually move to a location and carry out various social events of online/offline interactions after positioning through a mobile device, and this system includes a virtual world management processor and a user processor. The virtual world management processor augments a plurality of parallel virtual worlds by basic map information of the real world, wherein each of the virtual worlds includes a self-defined world title and a virtual map corresponding to each respective virtual world, and each world title has corresponding environment skin information and a plurality of location point information, and each location point information has a geographical parameter; the virtual maps are combined with the basic map information and generated based on the environment skin information and the location point information of the world title. The user processor is provided for the users to create a personal account and electrically connected to the virtual world management processor, and the user processor includes a virtual character creation processor and a login processor. The virtual character creation processor is provided for creating a virtual character, tied with the personal account and displayed on the mobile device; the login processor is provided for the users to login the virtual world management processor by the personal account, and select one of the virtual worlds to synchronously displace the virtual character in the virtual map of the selected virtual world with the users, such that when a user moves to the location of the location point information, the user can read, write or update the content of the location point information for a location-based social event. Further, the user can freely switch to the virtual map of any one of the virtual worlds, and then carry out a location-based social event based on the location point information existed in each virtual map, and the location point information can be set by selecting a position by the user after moving to a location in each virtual map; when the location point information is created and set, the content of the location point information is written and updated, or when at least one mission is generated around the location point information or the mission is completed, the formation of an event is recorded, and the event has a time parameter and a geographical parameter corresponding to the location point information.

To strengthen of the social interaction of different theme worlds, the location point information in any one of the virtual maps can be broadcasted to other virtual maps having the location point information with the same geographical parameter.

In order to obtain better immersive experience of virtual reality integration, a NFT digital product is generated according to one of the events or a combination of two or more of the events; and the virtual world management processor further issues a cross-border currency which can be circulated in each of the virtual worlds and used for trading the NFT digital product, and the cross-border currency can be obtained by value recharging or completing the mission generated around the location point information.

Wherein, the location point information in the virtual maps includes at least one NFT trader provided for the user to trade the NFT digital product at the NFT trader. Further, some attributes of the NFT digital product are visibility data displayed on the mobile device. For example, the NFT digital product is visibility data of wearing accessories of the virtual character, and the NFT digital product can be worn on the virtual character.

To improve the diversity of the location-based service, the system of this disclosure further includes a remote range in which the user executes a drone mode within a limited time to move to a location where the user is not situated; or a patrol range in which the user executes a cruise mode to move in the patrol range extending around the user's location; or a summon mode executed by another user, such that the called user moves to the location of the user executing the summon mode, and the user can participate in the missions generated by the location point information around the position where the user is not situated without requiring the user to actually move to such location.

To improve the social interaction among the users, one of the virtual worlds is defined as a public world, and the virtual map of the public world is divided into a plurality of land blocks, and a user can select an attribute to actually move to a land block and execute the drone mode or the cruise mode, or receive the summon mode executed by the other user before going to the land block, and then occupy the land block according to the a land occupancy chip possessed by the user, and obtain a reward value after occupying the land block; if two or more users compete for the ownership of occupation of the land block, the users will be grouped individually according to the attribute they selected, and the group having a greater number of the total number of land occupancy chips will be determined to occupy the land block and obtain the reward value, and the reward value will be distributed according to the proportion of the land occupancy chips put in by the user who occupies the land block, wherein the reward value can be converted into the cross-border currency.

To improve the stickiness of online and offline, the virtual world management processor issues at least one digital coupon for each online virtual world, and the cross-border currency can be used to buy the digital coupon, and the digital coupon can be used for the trading in a physical store offline.

To improve the participation of the users, the user obtains a contribution value in each of the virtual worlds after executing at least one of the events, and leaderboard information is generated based on the total of contribution values of two or more users.

Based on the same technological concept, this disclosure further provides a location-based metaverse social system combining the real world with virtual worlds for virtual reality interaction, provided for at least one user to actually move to a location and carry out various social events of online/offline interactions after positioning through a mobile device, and the system includes: a virtual world management processor, for combining basic map information of the real world to augment a portal world, and creating a plurality of parallel virtual worlds, and each of the virtual worlds includes a self-defined world title, and each of the virtual worlds having display column information corresponding to the world title, and the portal world having a plurality of location point information, and each of the location point information having a geographical parameter; wherein, each of the virtual worlds comprises a base block and at least one territory block adjacent to the base block, and the base block is provided for showing the display column information, and the territory block points at the geographical location of the portal world; after the user enters into any one of the virtual worlds, the user can move between the base block and the territory block, and browse or edit the display column information in the base block to carry out the social event, or quickly transfer from the territory block to the geographical location in the portal world correspondingly; and a user processor, provided for the user to create a personal account, and electrically connected to the virtual world management processor, and includes: a virtual character creation processor, provided for creating a virtual character, wherein the virtual character is tied with the personal account and shown on the mobile device; and a login processor, provided for the user to login the virtual world management processor by the personal account, and synchronously displace the virtual character in the portal world with the movement of the user, and when the user moves to a location of the location point information, the user can read, write or update the content of the location point information for the location-based social event; wherein, the user can freely switch from the portal world to any one of the virtual worlds to browse or edit the display column information to carry out the social event.

The location point information can be created by the user by selecting a location after moving in the portal world, and when the location point information is created, the content of the location point information is written and updated, or when at least one mission is generated around the location point information or the mission is completed, an event will be recorded respectively, and the event includes a time parameter and the geographical parameter corresponding to the location point information. In this way, the degree of freedom of experience can be enhanced, and the user's personal behavior can be more prominent and characterized.

To provide immersive experience of better virtual reality integration to users, a NFT digital product is generated based on one of the events or a combination of two or more of the events; and the virtual world management processor further issues a cross-border currency which can be circulated in each of the virtual worlds and used for trading the NFT digital product; and the cross-border currency can be obtained by recharge or obtained by completing the mission generated around the location point information.

Further, some attributes of the NFT digital product attribute are visibility data displayed on the mobile device. For example, the NFT digital product is visibility data of a wearing accessory of the virtual character, and the NFT digital product can be worn on the virtual character.

To improve the diversity of the location-based service, the system of this disclosure further includes a remote range for the user to execute a drone mode within a limited time and move to a location where the user is not situated; or a patrol range for the user to execute a cruise mode and move in the patrol range extending around the user's location, or a summon mode executed by another user to move the called user to the user location where the summon mode is executed, such that the user can participate in the mission generated by the location point information around a location where the user is not situated without the need of actually moving to said location.

To improve the social interaction among users, the portal world is divided into a plurality of land blocks, and the user can select an attribute to move to one of the land blocks, and then occupy the land block based on a land occupancy chip possessed by the user and obtain a reward value after occupying the land block; if two or more users compete for the ownership of occupation of the land block, the users are divided into groups according to the attribute selected by each user respectively, and then the group having a larger total number of the land occupancy chips is determined to occupy the land block and obtain the reward value, and the reward value is allocated in proportion to the land occupancy chips invested by the users occupying the land block, and the reward value can be converted into the cross-border currency.

After the land block is occupied, the territory block is formed by mapping the land block that is occupied to adjacent to the base block of the users that has the right to occupy, and the territory block can be embedded into various static or dynamic electronic information and mapped to the corresponding land block for display, so as to express the social charm more intuitively and enhance the users' interactive entertainment.

To improve the stickiness of online and offline, further the virtual world management processor issues at least one digital coupon for each of the online virtual worlds, and the cross-border currency is provided for buying the digital coupon, and the digital coupon can be used for trading in a physical store offline.

To improve the participation of the users, the user obtains a contribution value after the user executes at least one the event in the portal world, and the total of the contribution values of two or more users is provided for generating leaderboard information.

In summation of the description above, this disclosure expresses various themes such as various target including brand, merchant, agency, corporation, event, idol or channel operation various by the concept of parallel virtual worlds and cross-border visits, together the self-created location point information and environment skin configuration function, to enhance the personalized performance of the theme world. In addition, the location-based service and the NFT digital product technology generated by the concept of "event" concept together with the functions of land occupancy activity, various games and virtual cross-border currency, etc. are used to allow different point locations of online/offline merchants to greatly improve the user stickiness, so as to deepen the social interactivity of the users and provide better immersive experience to improve their loyalty and retention.

DESCRIPTION OF THE EMBODIMENTS

This disclosure will now be described in more detail with reference to the accompanying drawings that show various embodiments of this disclosure. It is intended that the embodiments and drawings disclosed herein are to be considered illustrative rather than restrictive.

Figure 1:
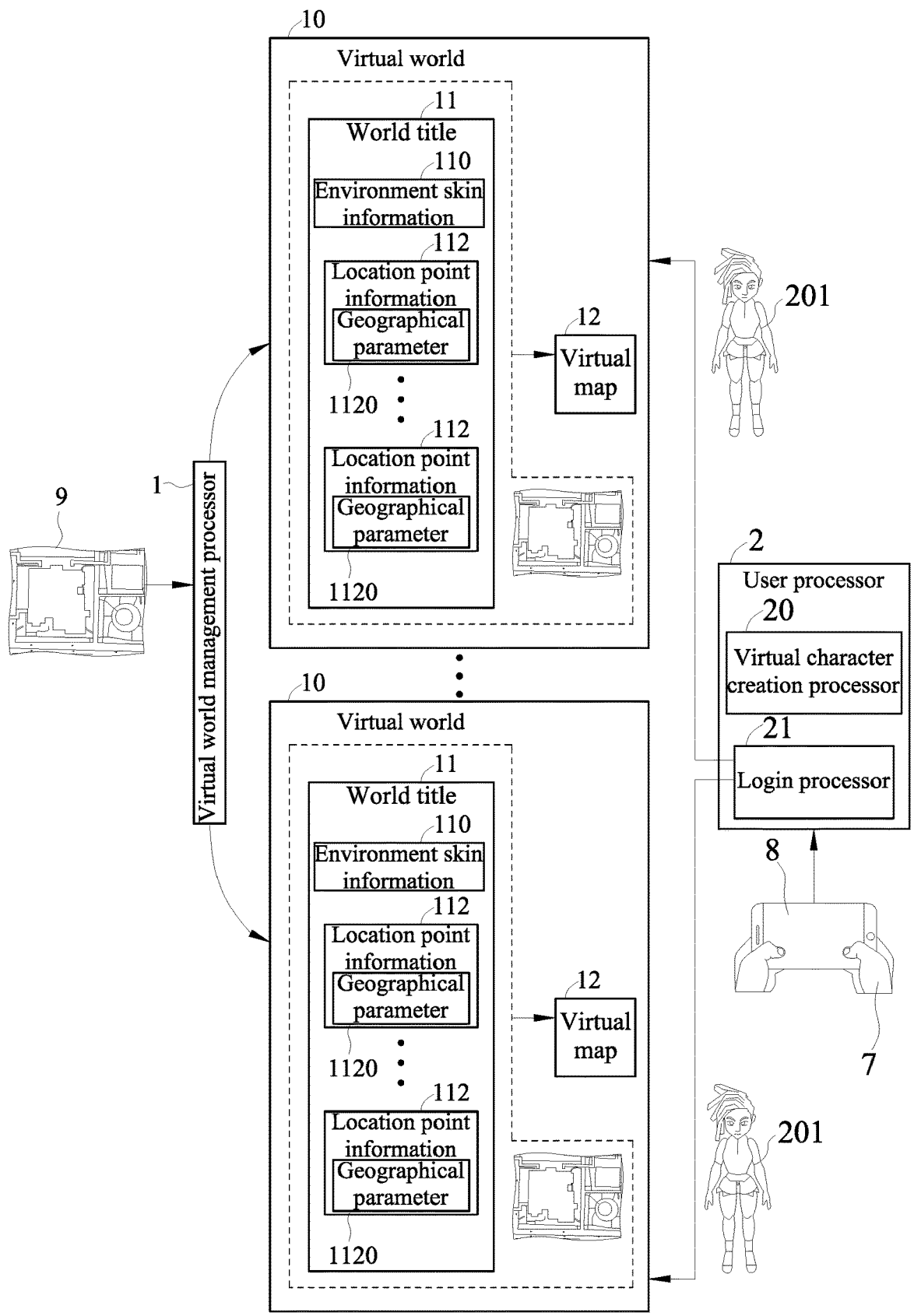
FIG. 1 is a system functional block diagram of an operation structure of a first preferred embodiment of this disclosure.

With reference to FIG. 1 for a system functional block diagram showing the operation structure in accordance with the first preferred embodiment of this disclosure, this disclosure provides a location-based metaverse social system combining the real world with virtual worlds for virtual reality interaction, and the system is provided for at least one user 7 to actually move to a location and carry out various social events of online/offline interactions after positioning through a mobile device, comprising, and the system includes: a virtual world management processor 1 and a user processor 2. The virtual world management processor 1 augments a plurality of virtual worlds 10 by basic map information 9 of the real world. In other words, the basic map information 9 of the real world at least includes various basic information labels such as a street or a building, etc. or map information with similar attributes of the google map, and this system uses the basic map information 9 as a base, and further changes its visual environmental performance or the location of the information configuration and content, so as to derive a "metaverse" model of a plurality of parallel virtual worlds 10. After the user 7 carry out a site positioning of the corresponding mobile device 8, the user 7 further selects the virtual world 10 where the user 7 is situated to carry out a subsequent social event of the location-based service (LBS).

Further, each of the virtual worlds 10 has a self-defined world title 11 and a corresponding virtual map 12, and each world title 11 has corresponding environment skin information 110 and a plurality of location point information 112, wherein the location point information 112 has a geographical parameter 1120. The virtual maps 12 are generated by combining the basic map information 9 with the environment skin information 110 and the location point information 112 corresponding to the world title 11. For example, the world title 11 can be displayed as various attributes or connotations, such as the virtual worlds 10 with various superior/inferior connotations including a gourmet world, idol world, boutique world, sports world, 3C world, power machine world, science fiction world, literary world, anime world, film world, animal world, insect world, cat world, eco world, etc. as required. Therefore, the single virtual world 10 can be presented as a concept of "social theme forum", and the location point information 112 can be understood as a unit concept of "a discussion thread", and the location point information 112 is provided for each user 7 to leave a message, paste a sticker, or place video information for various social interactions.

Taking the idol world as an example, the environment skin information 110 can use the design elements relevant to one or more idols as environment configuration. For example, in the virtual world 10 of the global idol group AKB48, the environment skin information 110 can be designed with an integral form visually relevant to the AKB48's clothing or album. In addition, the location point information 112 can be set in various information sites relevant to the idol, such as the location point information 112 of a store that sells the AKB48 idols' peripheral products, or the location point information 112 of a location where the idol performs various activities, and various social communications with the idols such as fan club, autograph session, live concert, flash event, etc. When the user 7 moves to the location point information 112, the user 7 can carry out a corresponding online/offline interaction and various social communication of virtual reality integration. Taking gourmet world as the world title 11 as an example, the environment skin information 110 of the virtual world 10 can be presented as the material of various gourmets, and the virtual world 10 is like a gourmet map provided for users to follow the map for exploration. It is noteworthy that the aforementioned examples are used for illustrating this disclosure only, and the world title 11 can also be set as the superior/inferior performance of various virtual worlds 10.

Further, the user processor 2 is provided for the user 7 to create a personal account and electrically connected to the virtual world management processor 1, and the user processor includes: a virtual character creation processor 20 and a login processor 21. wherein, the virtual character creation processor 20 is provided for creating a virtual character 201, and the virtual character 201 and the personal account are tied with each other and displayed on the mobile device 8. The login processor 21 is provided for the user 7 to login the virtual world management processor 1 by the personal account, and select one of the virtual worlds 10, to synchronously displace the virtual character 201 in the virtual map 12 of the selected virtual world 10 with the user 7. When the user 7 moves to the location of the location point information 112, the user 7 can read, write or update the content of the location point information 112 for the location-based social event. In other words, when the user 7 moves in the real world, it means that the virtual character 201 selected by the user 7 in the virtual world 10 can synchronously move by using the location-based service, and search for various location point information 112 in the virtual map 12 to carry out the social interaction communication.

In particular, the user 7 can freely switch to the virtual map 12 of any one of the virtual worlds 10, and then carry out a location-based social event based on the location point information 112 existed in each corresponding virtual map 12. For example, the user 7 is situated in the virtual world 10 of the "idol world", and the user 7 particulate in an AKB48 favorite food collection activity initiated by the idol group. Now, the user 7 can move to the virtual world 10 of the "gourmet world" for exploration and complete the activity mission. In addition, the "metaverse" model of this disclosure can continuously insert various location point information 112 of virtual reality integration. In other words, a virtual store in the virtual map 12 not existing in the real environment, or building information with the same location or perimeter of the real environment can be shown. For example, the location point information 112 of a flash event can be created at the location and perimeter of the actual store, so as to enhance the versatility "metaverse" model and allow the user 7 to be more immersed in the virtual reality transition between the virtual worlds 10 and the real world, and the location point information 112 can be created by the user 7 by moving to each virtual map 12 and selecting a location. If the location point information 112 is created, the content of the location point information 112 will be written and updated, or if at least one mission is generated around the location point information 112 or the mission is completed, an "event" will be formed and recorded separately, and the "event" has a time parameter and the geographical parameter 1120 corresponding to the location point information 112. For example, when the user 7 leaves a message in any of the location point information 112, such conduct has significance in location and time. In other words, the conduct includes the geographical parameter 1120 of the location point information 112 and the time parameter for generating and defining an "event". Regardless of being an online virtual site, or presented in conjunction with a physical site, the location point information 112 can have a perimeter to be set for various small games to enhance the social interaction such as fighting with monsters, hunting for treasure, limited activity, AR interaction, and various missions in a game for the user 7, and the execution of these missions will generate an "event". This disclosure combines the crowd gathering of the actual offline location and the online virtual social group by a composite interest map, such as each parallel virtual world 10 with the interest of gourmet, music, home stuff, etc. as the theme, to allow various different users 7 with diverse interests to carry out a social communication with like-minded partners.

Figure 2:
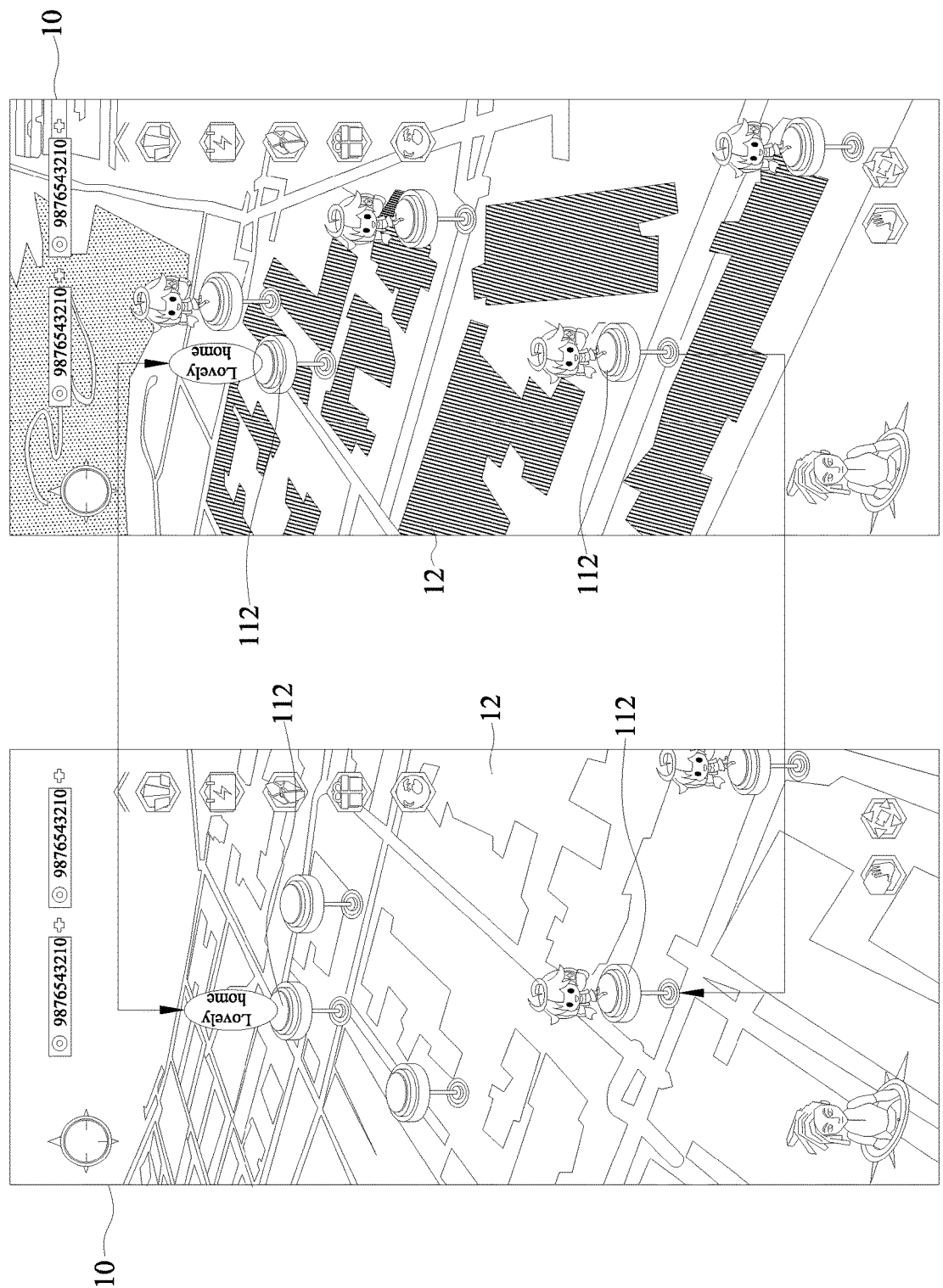
FIG. 2 is a schematic view showing a mutual broadcast among a plurality of parallel virtual worlds of the first preferred embodiment of this disclosure.

In FIGS. 1 and 2, FIG. 2 shows a mutual broadcast among a plurality of parallel virtual worlds of the first preferred embodiment of this disclosure. To strengthen of the social interaction of different virtual worlds 10, the location point information 112 of any one of the virtual maps 12 can be broadcasted to other virtual maps 12 having the location point information with the same geographical parameter. For example, although each user 7 can move in has the selected virtual world 10 on their own preference, the location point information 112 simultaneously existing in the plurality of virtual worlds 10, such as a store or a base of business nature, can be known by the users 7 in each virtual world 10, and such information include various information on marketing advertising, promotion activity, etc. At this time, the parallel virtual worlds 10 can broadcast each other, and the location point information 112 after broadcast can be further set as the entry location for switching into the virtual worlds 10. In this way, the users 7 in the parallel virtual worlds 10 can know the broadcast information, and it is more convenient to quickly switch and move to the location of the location point information 112 of the other virtual worlds 10.

Figure 3:
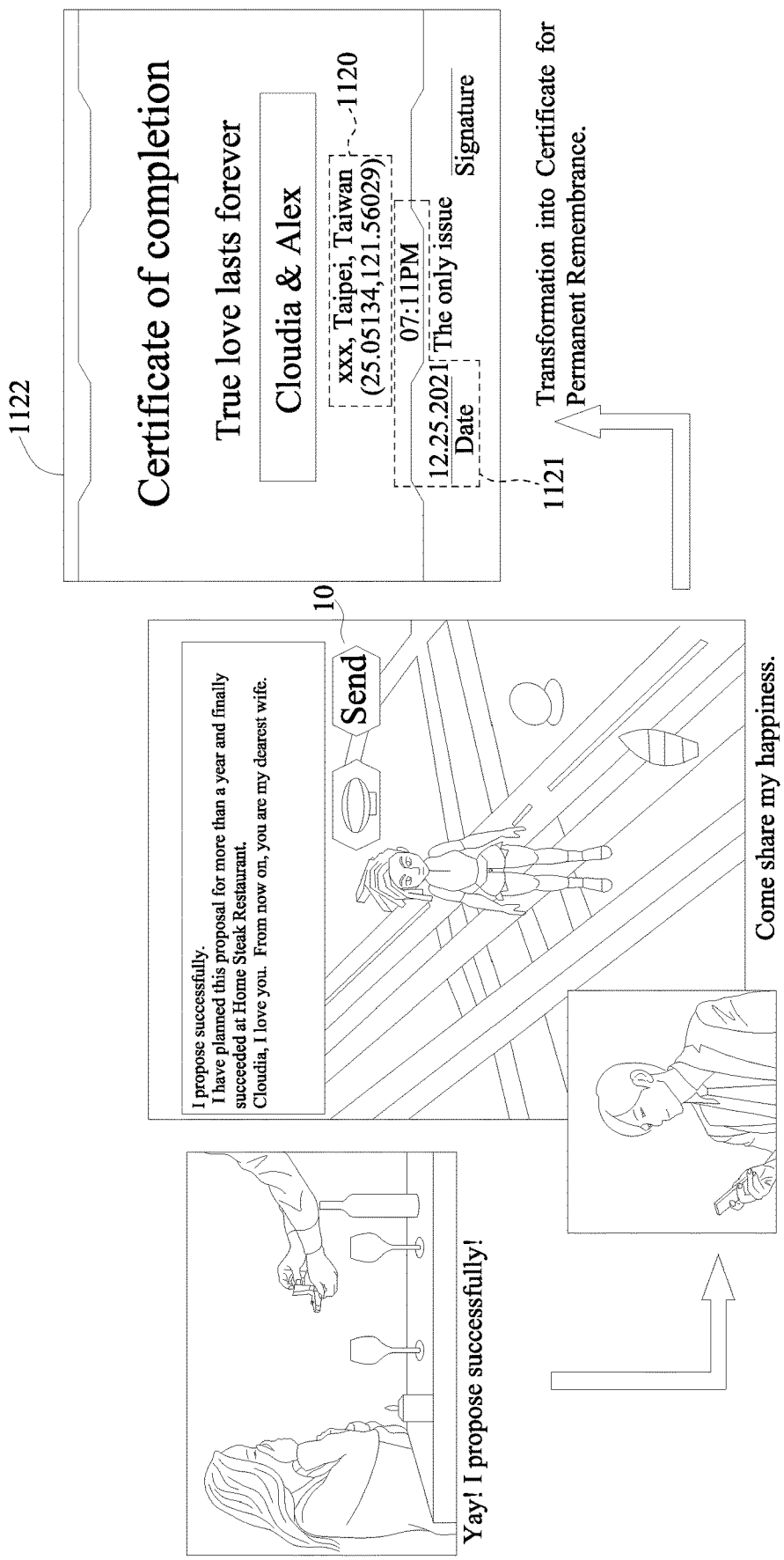
FIG. 3 is a schematic view of converting an "event" to generate a NFT digital product in accordance with the first preferred embodiment of this disclosure.

In FIGS. 1, 2 and 3, FIG. 3 is a schematic view showing the conversion of an "event" to generate a NFT digital product in accordance with the first preferred embodiment of this disclosure. In many conventional games in the past, it is common to have the concepts of virtual product, treasure or equipment. However, the virtual products only exist in the game, and will be lost after the game is over. In addition, the virtual product usually has no economic value or unique specialty. Even if there are commercial transactions, they are mostly economic activities privately exchanged between players, rather than strict supporting measures. In the area of trading digital products, a non-fungible token (NFT) is introduced, and NFT is a unique digital identifier representing a certain unique matter or unique digital property, NFTs are not mutually interchangeable and can be used as an alternative representation from digital products such as the objects in the virtual world to physical assets. In order to maintain the security of this digital product, promote its credibility and ensure its value, the blockchain technology is adopted to record the NFT in a blockchain. Since the blockchain technology has the feature of distributed storage which is related to the decentralized storage method and distributed algorithm, therefore no one can change the data on the network at will, thus eliminating the possibility of human manipulation and modification. In other words, once a record of data is written, it cannot be changed. Once the data is authenticated, it is permanently written into the block. This special algorithm using a one-to-one correspondence function to ensure that the data is not tampered, so that the ownership of these assets is recorded by the chainblock of the block chain technology and can be circulated. In the past, most NFTs were conducted in the form of "product digitization" such as painting, music, film, player card, virtual treasure, etc., but unlike the related art, this disclosure adopts the concept of "event" for creating the digital products with "memory" and "commemoration" as the main body; such as live concert, party, date, or ball game, etc. Therefore, this disclosure can add a 3D-geographical element and a 4D-time element to generate a NFT digital product according to one of the events or a combination of two or more "events". After the NFT digital product is added, the significance of the NFT digital product at the "location" is improved to give the meaning to the coordinates in the 3D space, and add the mark of the NFT digital product on the "time" to mark the scale position on the 4D time. Therefore, the group has a common memory attribute and the reputation recognized by the public, and also has general values to present glory or privileged "events" to be commercialized; or a personal collection memory attribute that commercialize an "event" of a high commemoration collection value for personal activities with special meaning.

In an example as shown in FIG. 3, "Alex" proposes to "Cloudia" in a restaurant at a certain location of the location point information 112 in one of the virtual worlds 10. Since the "event" has the time parameter 1121 and the geographical parameter 1120 corresponding to the location point information 112, therefore it is exciting that when "Alex" successfully proposes to "Cloudia" and wants to keep the moment worthy of remembrance, the "event" in this system can be converted to generate a NFT digital product, such as a digital certificate 1122. In another example, an NBA star player sets a historical record on a certain day at a certain place, an "event" is generated according to the time parameter 1121 and the geographical parameter 1120 to generate various NFT digital products related to the "event" based on these perimeters, and the users 7 need to make a location-based movement to the place and participate in the ball game at the time parameter, before having the chance of obtaining the NFT digital product issued based on the record-breaking date and place. In another example, a live concert is held by a certain idol at a certain time and a certain place, and the live concert has a special event such as "Guessing the song performed in the live concert" mission, and gives a limited edition of the NFT digital product certificate with the highest-level fans certification to the user 7 who has completed the mission. In the future, the user 7 who owns the NFT digital product certificate can obtain the exclusive gift provided by the idol through the virtual reality integration.

Since the NFT digital product provides the ownership record through the blockchain technology, the NFT digital products have the characteristics of decentralization, non-tampering, and traceability, etc. to ensure that the unique specialty and economic value of the NFT products. Further, in order to make the NFT product closer to the usage impression of virtual reality integration, the attributes of some of the NFT digital products such as a player card, a license, a coupon, a membership card and various certificates are visibility data that can be displayed through the mobile device 8; or the NFT digital products are visibility data of the clothing and accessories of the virtual character 201, and the NFT digital products can be worn on the virtual character 201. Visibility data can satisfy the sense of glory of each user 7, such as wearing unique clothing and accessories on the virtual character 201 and displaying them, for online/offline virtual reality integration merchants or activities and other fields, for various certificates of special identities to serve as identification, and the visibility data is conducive to the improvement of trading liquidity.

In order to facilitate the trading and circulation of the NFT digital products, the virtual world management processor 1 further issues a cross-border currency which can be circulated and used in each virtual world 10 for trading the NFT digital product; and the location point information 112 in the virtual maps 12 includes at least one NFT trader, provided for the user 7 to trade the NFT digital product by the NFT trader. Wherein, the cross-border currency can be obtained by recharge or can be obtained after completing the mission generated around the location point information 112. Of course, the cross-border currency issued in accordance with this disclosure can be recorded in blockchains through the block chain technology to improve the circulation reliability and security of the cross-border currency, so that various virtual products recorded by blockchains have high security and tradability, and the NFT trader sets an auction mechanism to allow the users 7 to sell their own NFT digital products. Once the NFT digital product is available for trading, it has the advantages of: 1. maintaining liquidity, and maintaining product exposure and topicality; 2. creating product value-added space by free bids; 3. promoting communication and competition between players/fans, which can greatly promote social interaction between the users 7. As described above, "the location point information 112 can have a perimeter to be set for various small games such as fighting with monsters, hunting for treasure, limited activity, AR interaction, and various missions in a game for the user 7", and thus the currency can be issued in the same way as the GameFi, after the mission generated around the location point information 112 is completed. The NFT trader can be attached to a physical store in the virtual reality integration manner and created and displayed on the virtual map 12; or just virtually created without a corresponding physical store. These two implementation methods are appropriate practices, and of course, virtual flash stores derived from this base are also appropriate examples.

Figure 4A:
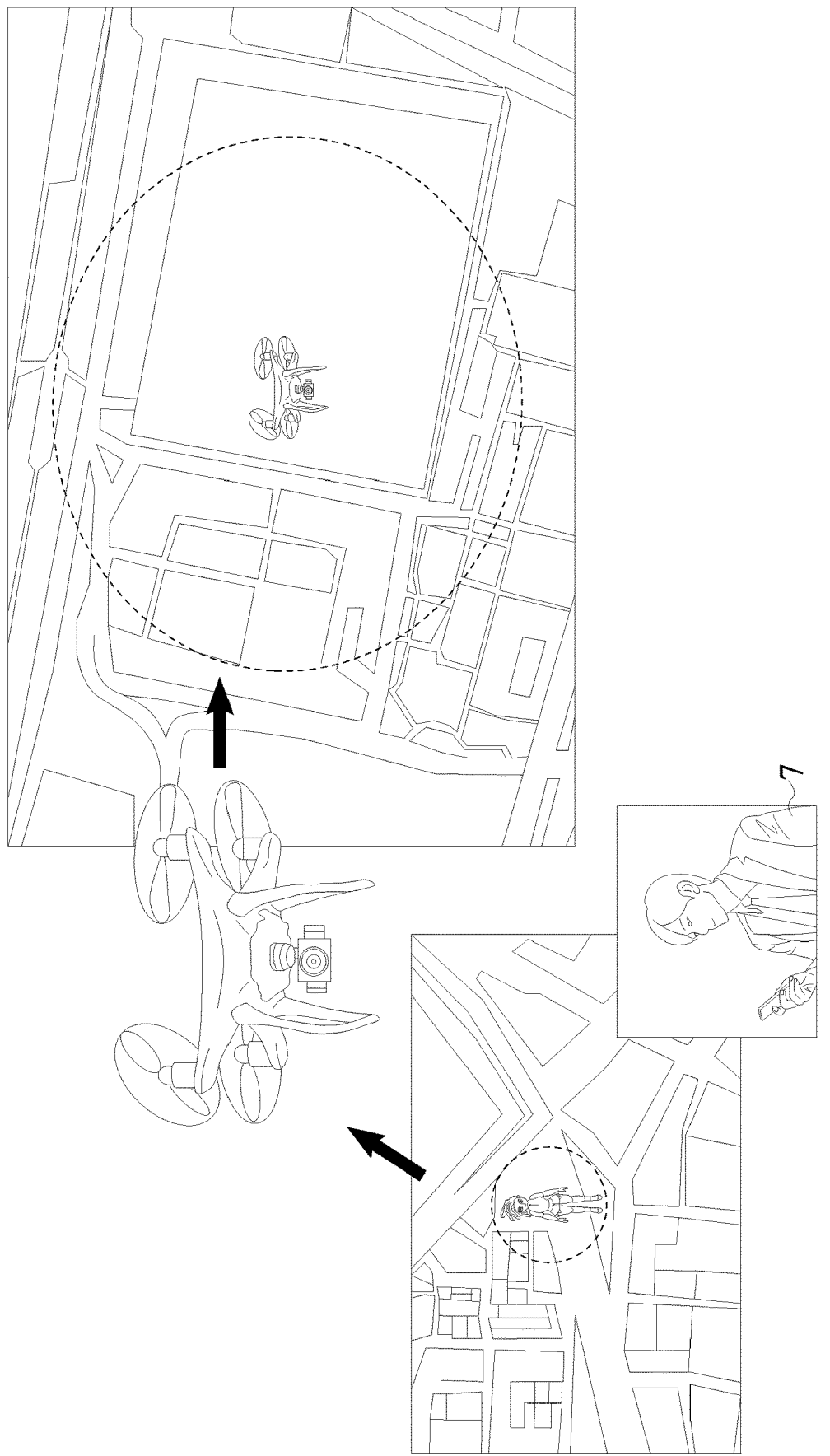
FIG. 4A is a schematic view of executing a "drone mode" to augment a location-based service positioning point location in accordance with the first preferred embodiment of this disclosure.
Figure 4B:
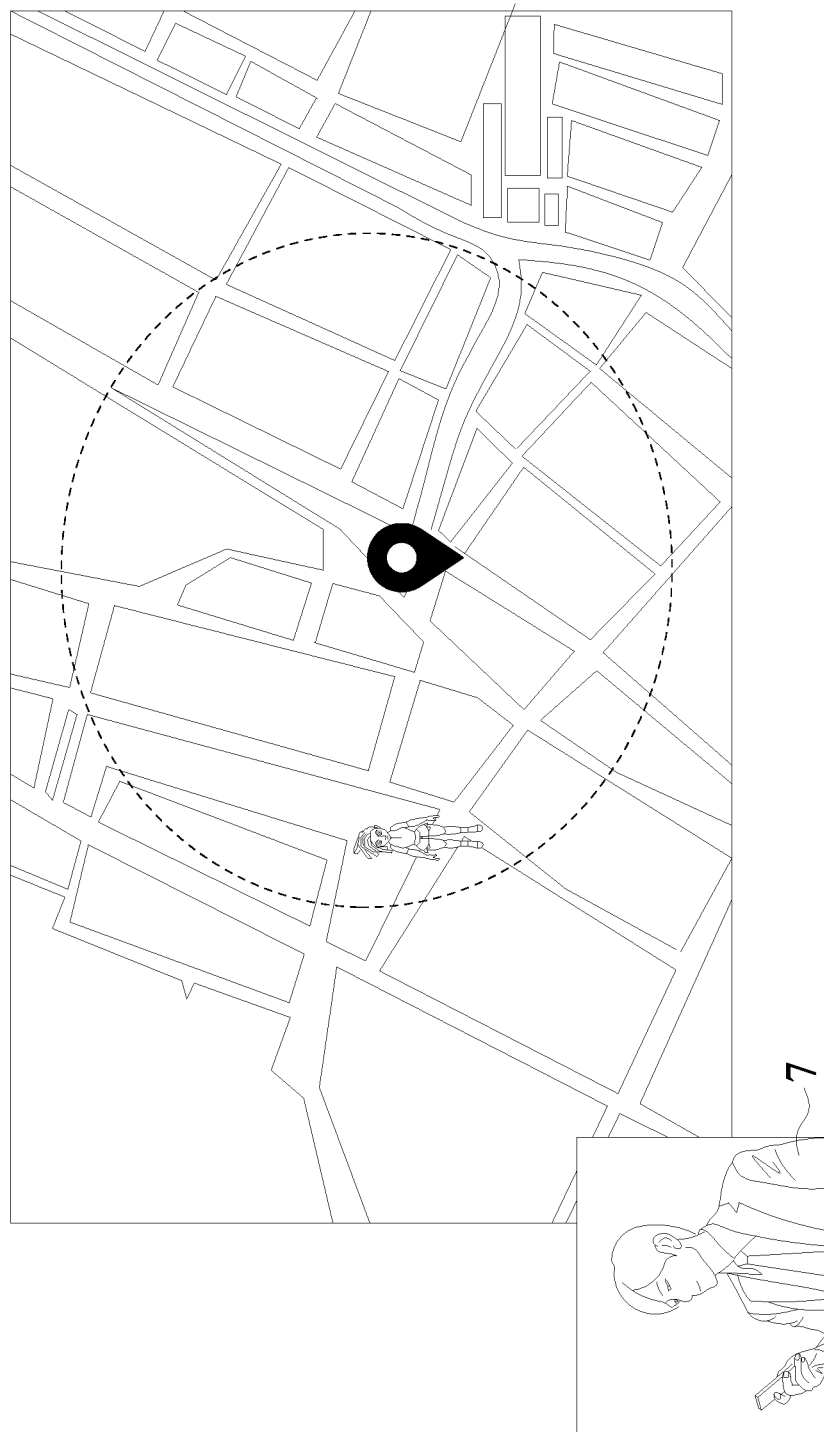
FIG. 4B is a schematic view of executing a "cruise mode" to augment a location-based service positioning point location in accordance with the first preferred embodiment of this disclosure.
Figure 4C:
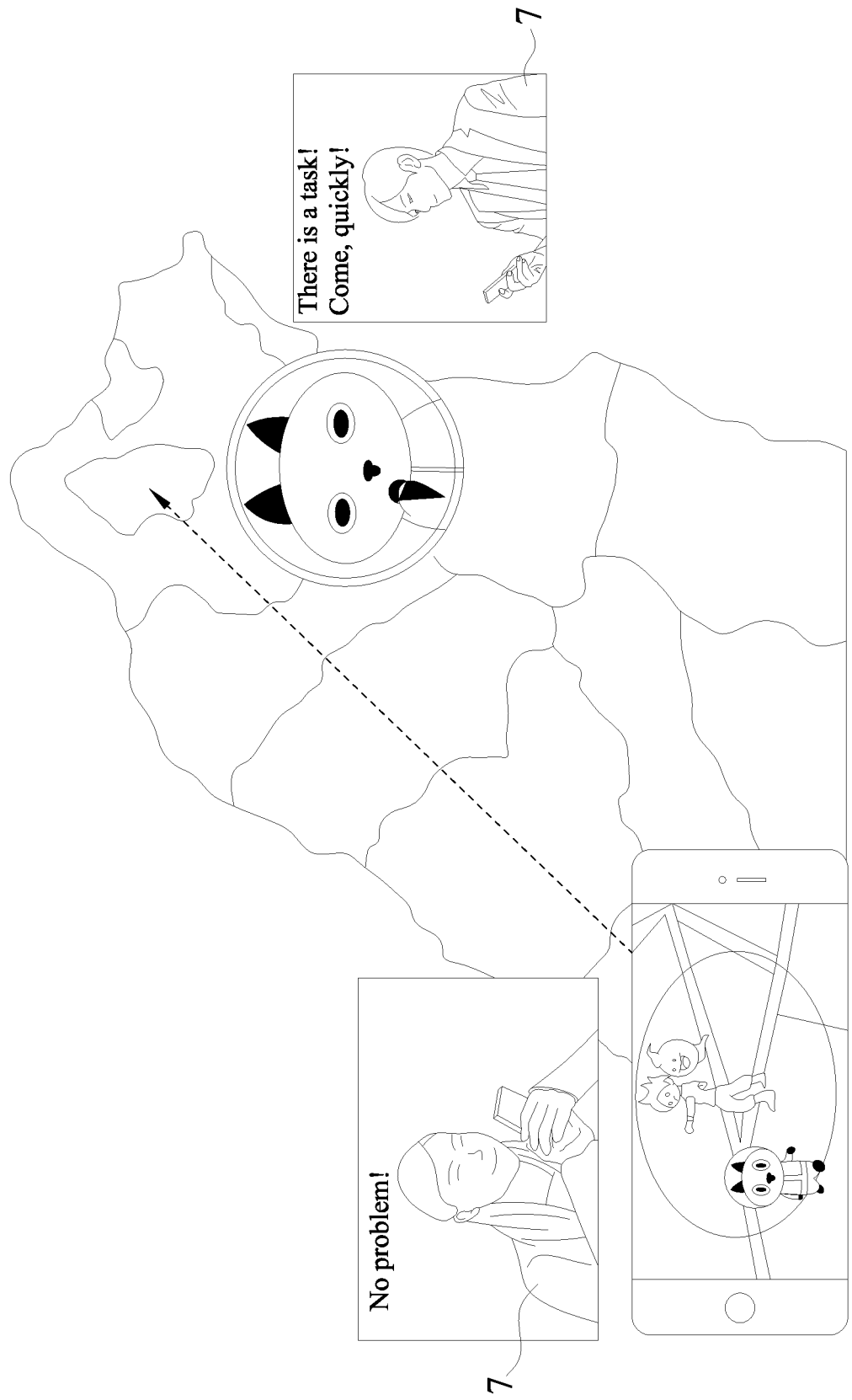
FIG. 4C is a schematic view of executing a "summon mode" to augment a location-based service positioning point location in accordance with the first preferred embodiment of this disclosure.
Figure 5:
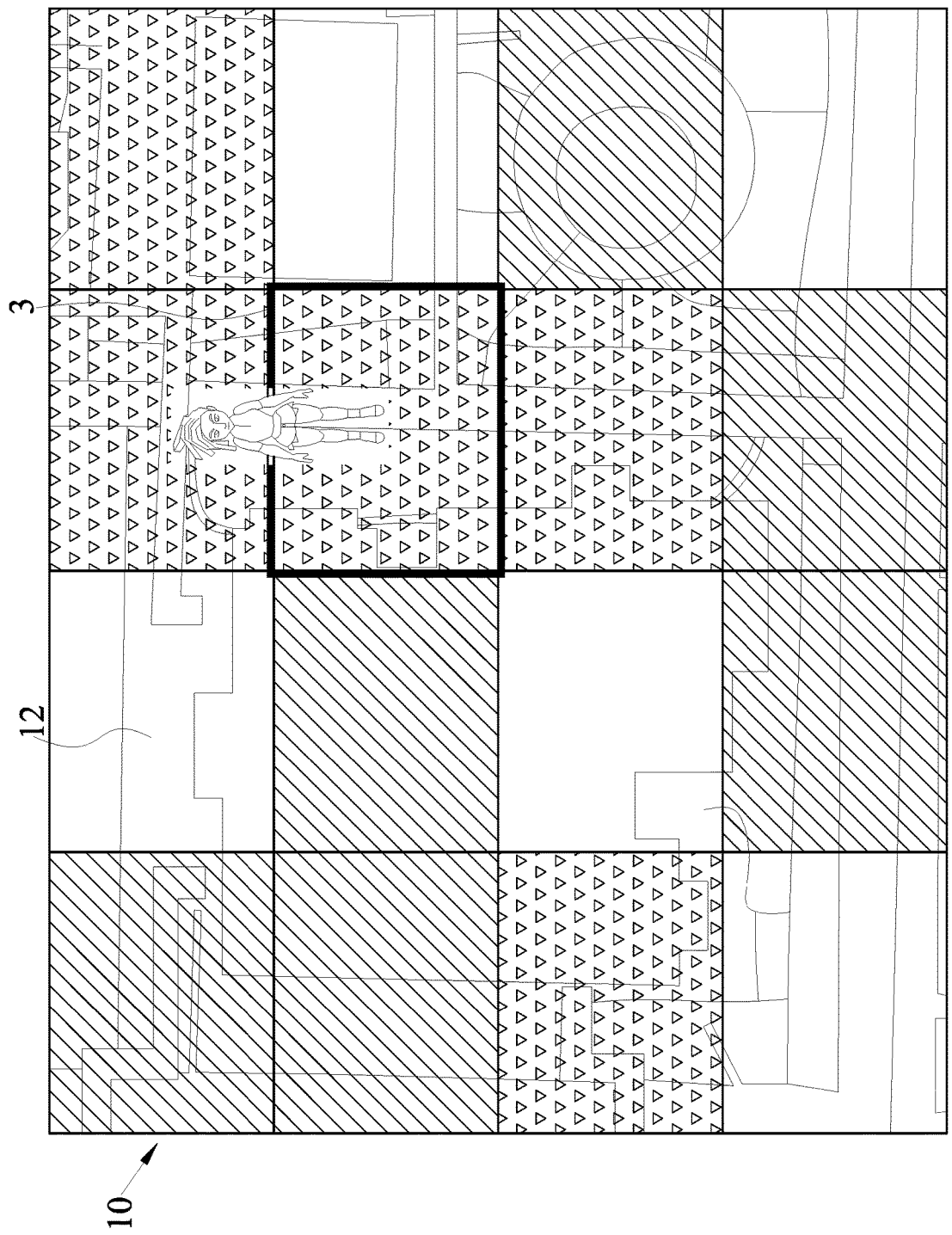
FIG. 5 is a schematic view showing a land occupancy page of the first preferred embodiment of this disclosure.

With reference to FIGS. 1-3, 4A, 4B and 4C, FIGS. 4A, 4B and 4C are the schematic views of the locations of the location-based service positioning point executed under the "drone mode", "cruise mode" and "summon mode" in accordance with the first preferred embodiment of this disclosure respectively. The advantages of traditional location-based services are that they have the characteristics of regional attribute, location guidance, personal participation, and integration of reality and virtuality. On the other hand, they have the disadvantages of regional restrictions, forced displacement, and monotonous repeatability of non-migrating players. In order to improve the diversity of location-based services, the system of this disclosure as shown in FIG. 4A further includes a remote range for the user 7 to execute a drone mode within a limited time to move to a location where the user 7 is not situated. For example, the drone props shown on the virtual map 12 can be moved and projected to the location of a remote map after executing the drone mode, and the location can be viewed in a short time, such as performing various missions including playing random games, fighting with monsters, leaving messages, carrying out an activity or obtaining the information. In FIG. 4B, the system of this disclosure further includes a patrol range for the user 7 to execute a cruise mode to move in the patrol range extending around the user's location, and allow the user 7 to perform various missions including playing random games, fighting with monsters, leaving messages, carrying out an activity or obtaining the information within the patrol range without moving the actual location. In FIG. 4C, the system of this disclosure further includes a summon mode executed by another user 7, such that the called user 7 moves to the location of the user 7 executing the summon mode, and the user 7 can participate in the missions generated by the location point information 112 around the location where the user is not situated without requiring the user to actually move to such location and can bring the online friends to the location to share the fun of various limited missions at that location.

In FIGS. 1-5, FIG. 5 is the schematic view showing a land occupancy page of the first preferred embodiment of this disclosure. In order to further improve the social interaction between the users 7, a public world is defined in one of the virtual worlds 10, and the virtual map 12 of the public world is divided into a plurality of land blocks 3, and the user 7 can select an "attribute" for an actual movement and execute the drone mode or the cruise mode or receive the summon mode of the other user 7 before going to the land blocks 3, and then occupy the land blocks 3 based on a land occupancy chip possessed by the user 7 and obtain a reward value after occupying the land blocks 3. When two or more users 7 compete for the ownership of occupation of the land block, the users 7 will be automatically divided into groups according to their "attributes", and the group having a larger total number of the land occupancy chips is determined to occupy the land block 3 and obtain the reward value, and the reward value is allocated in proportion to the land occupancy chips invested by the users 7 occupying the land block 3, and the reward value can be converted into the cross-border currency. The "attribute" can be understood as a corresponding follower for an idol or the same topic, so that the cohesion between fans or groups can be strengthened by the land occupation competition system, and at the same time, like-minded partners can increase the number of groups of their social friends to expand and extend the entire social connection. The aforementioned cross-border currency circulated in the virtual worlds 10 can be used to buy the NFT digital product, and the cross-border currency obtained after completing a mission, a recharge or a land occupancy event can also be used to buy at least one digital coupon issued by the virtual world management processor 1 in each online virtual world 10. For example, when consuming in a physical store, the mobile device 8 can be used as a digital coupon for discount or exchange in order to enhance the mutual stickiness of online and offline consumption behavior. In addition, in order to improve the participation of each user 7, after the user 7 executes at least one of the events at each virtual world 10, the user 7 obtains a contribution value, and leaderboard information is generated based on the total of contribution values of two or more users 7. Similarly, the leaderboard information can also be used as a social interaction for healthy competition, and once a person who obtains a better ranking in the leaderboard information, the system can also provide rewards such as the corresponding cross-border currency or the special the NFT digital product, etc. to encourage each user 7 to actively take part of the social participation of the virtual worlds 10.

Figure 6:
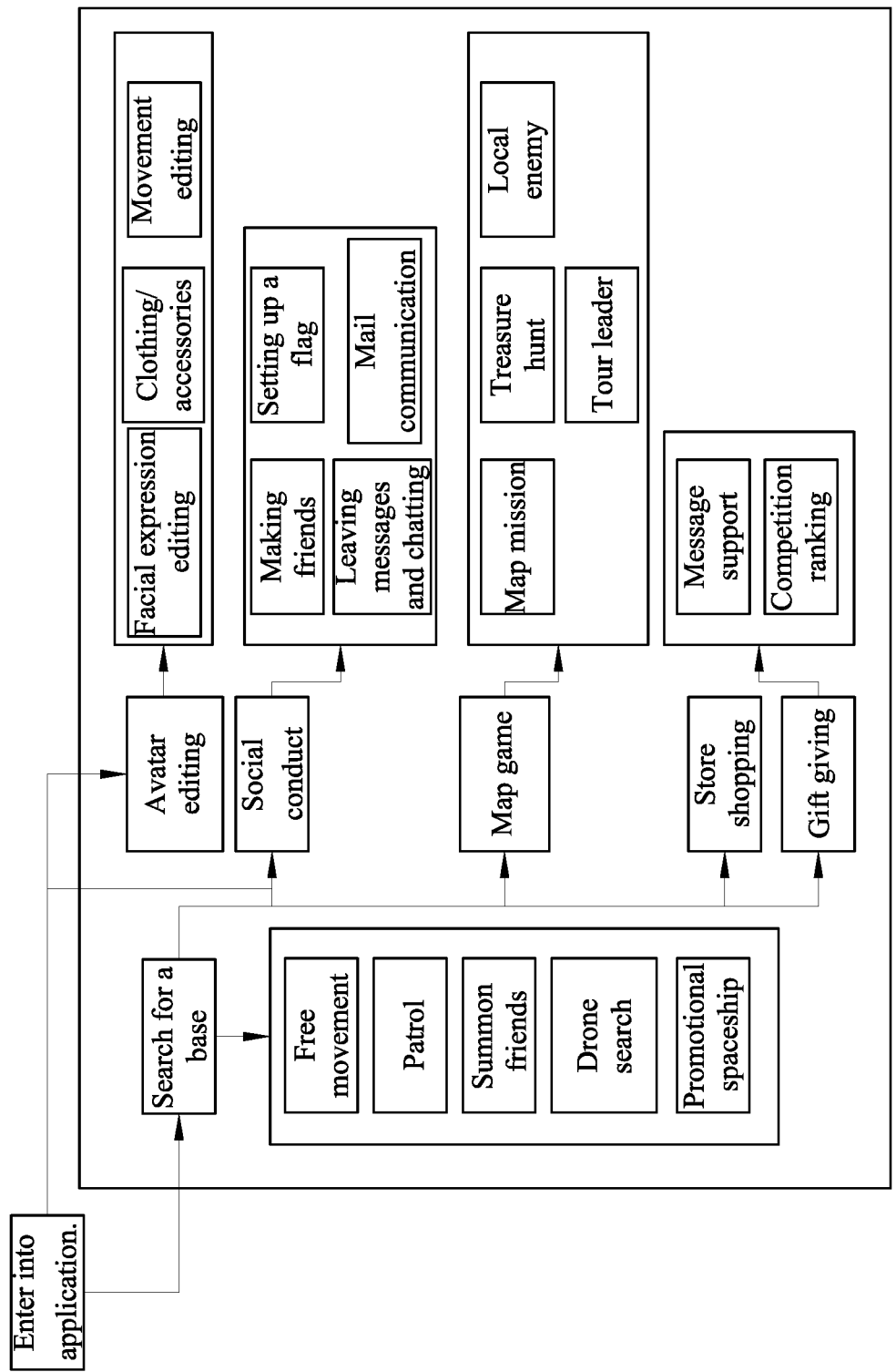
FIG. 6 is a block diagram showing the operation cycle structure of a user in a social media system of the first preferred embodiment of this disclosure.
Figure 7:
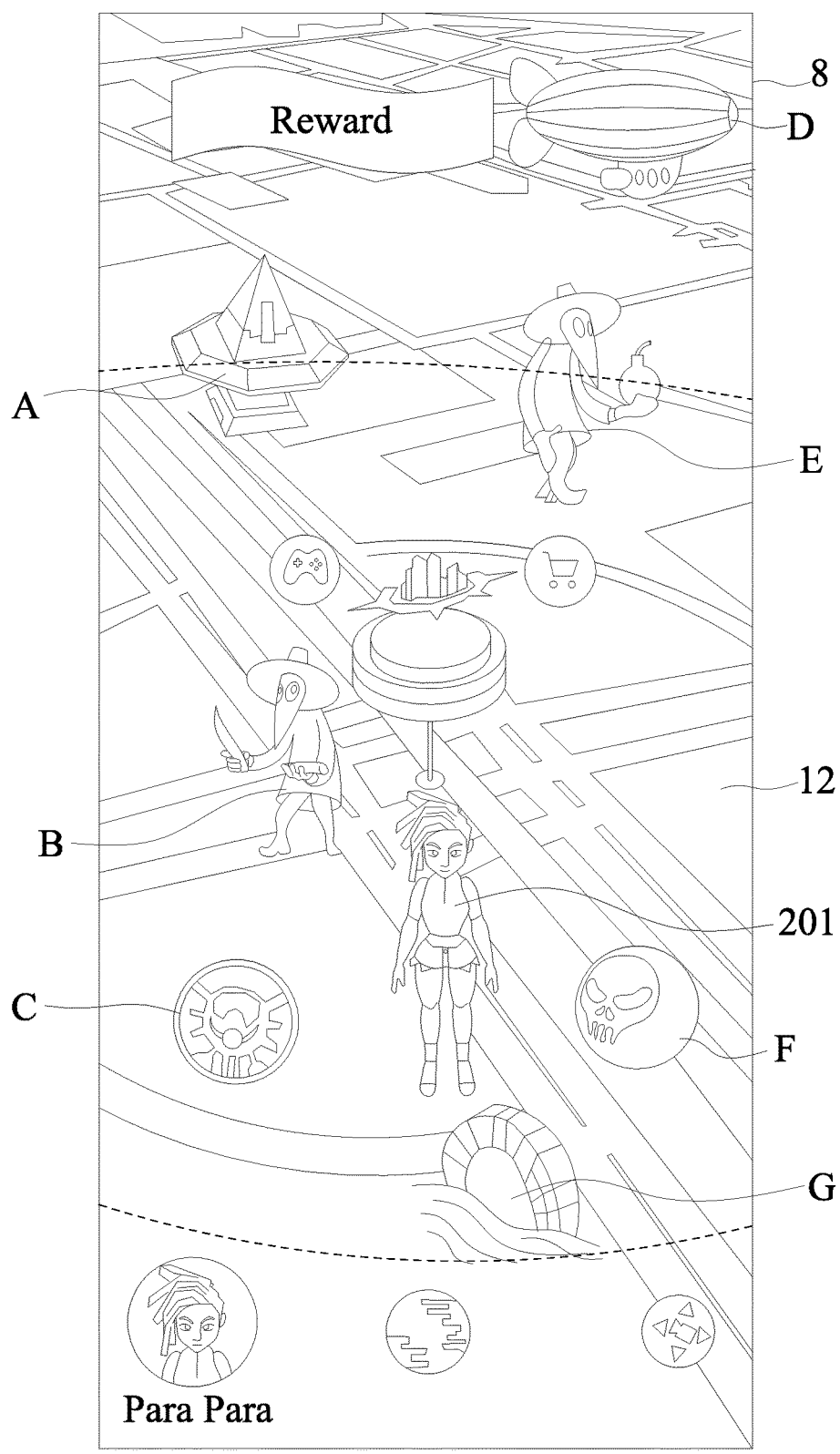
FIG. 7 is a schematic view of executing a display page of the first preferred embodiment of this disclosure.

With reference to FIGS. 1-7, FIG. 6 is the block diagram showing the operation cycle structure of a user in a social media system of the first preferred embodiment of this disclosure and FIG. 7 is the schematic view of executing a display page of the first preferred embodiment of this disclosure. In FIGS. 6 and 7, after the user 7 enters into this system, the corresponding application page can be displayed on the mobile device 8, and a personal account can be created by the user processor 2, and an Avatar can be edited to create its corresponding virtual character 201, and the details such as the facial expression, clothing/accessories, or movement, can be edited. After the virtual character 201 corresponding to the personal account has been created, the user can enter into the application page to select the corresponding virtual world 10 to carry out a social event, such as finding the attribute on the virtual map 12 as the location point information 112 of a "base" A. Wherein, the "base" A defined in this disclosure refers to the recommended site/gourmet site/store site/official site built by the system of this disclosure and provided for the user 7 to use the "base" A as a unit of "a discussion thread", and a carrier for leaving messages and interacting on the "base" A. The way of finding and contacting the "base" A is through free movement, cruise mode, summon mode, or drone mode. Further, a "promotional spaceship" D can be used to travel through each of the parallel virtual worlds 10 for selection and movement. Wherein, the self-defined "promotional spaceship" D described in this disclosure refers to the propaganda currently displayed on the display page showing where there is special activity information and provided for the user 7 to transfer and move to the location after clicking the "promotional spaceship" D. Once again, it is noteworthy that the examples given above are some appropriate examples for illustrating this disclosure only and many other ways of finding the "base" A can be derived or expanded. After the user 7 has found the "base" A, the user can perform a social event such as social conduct, map game, shopping, gift giving, etc., wherein the social conduct can be making friends, leaving messages and chatting, communicating via mail, or "setting up a flag" self-defined by this disclosure, and the so-called "setting up a flag" refers to the action taken by the user 7 to select a location on the virtual map 12 and build a temporary "base" A, and the attribute is a carrier provided for the user to leave a message for discussion, and it is only functioned in some with a mission derivation chance lower than that of the "base" A. Once the social conduct "setting up a flag" is completed, the user 7 can file an application to the system administrator for the examination to change to the "base" A, so as to obtain a long-lasting and functional point of use. In addition, the map game, includes "map mission" F, "treasure hunt" to find "local specialty" C, or a battle game with a "local enemy" E and a "tour leader" B. For shopping, an online transaction can be done when the page of the virtual map 12 shows an icon of "store" G. As to gift giving, it includes message support or competitive ranking, that is the user 7 can "set up a flag" in the "base" A of the favorite idol/store or giving a gift giving to the favorite idol/store which represent the support to the idol/store, and the income of the gift will also be split and transferred to the idol/store. As to the attribute, the gift also represents a string of messages, so that the user 7 sending a gift can leave a message to the idol, and the gift in each block has a leaderboard, so that the more gift the user 7 gives, the higher the ranking of the user 7. In this way, the name and message of the user 7 has a better chance of being noticed by the idol. It is noteworthy that the "setting up a flag", and "base" are substantially location point information 112, and the "map mission", "treasure hunt" for searching for "local specialty" C, or playing a battle game with the "local enemy" E and the "tour leader" B are the "mission" attribute, and the specific description above is only one of the implementation modes of this system, but not the only expression or action rule of this system.

Figure 8:
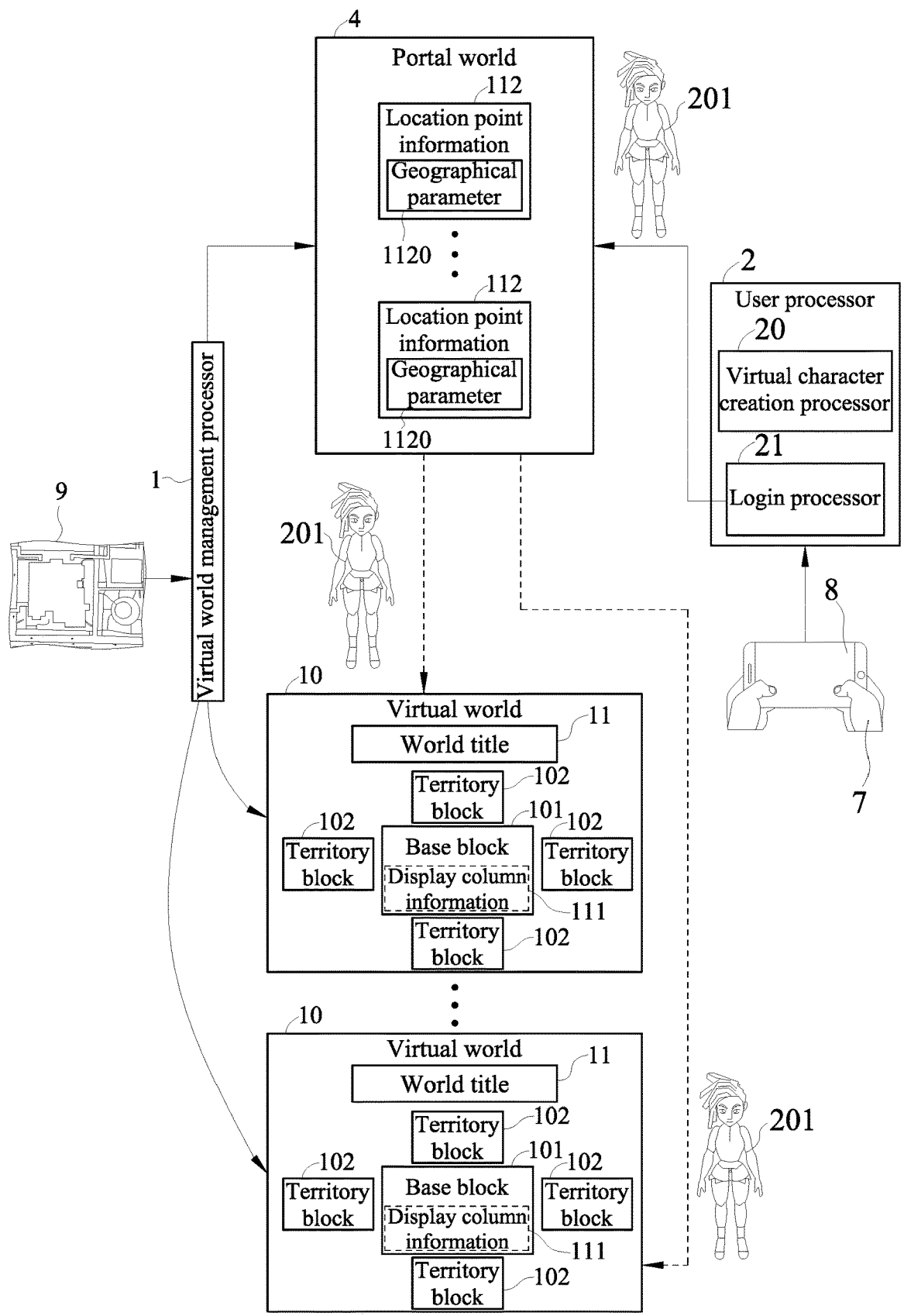
FIG. 8 is a system functional block diagrams of an operation structure of a second preferred embodiment of this disclosure.
Figure 9:
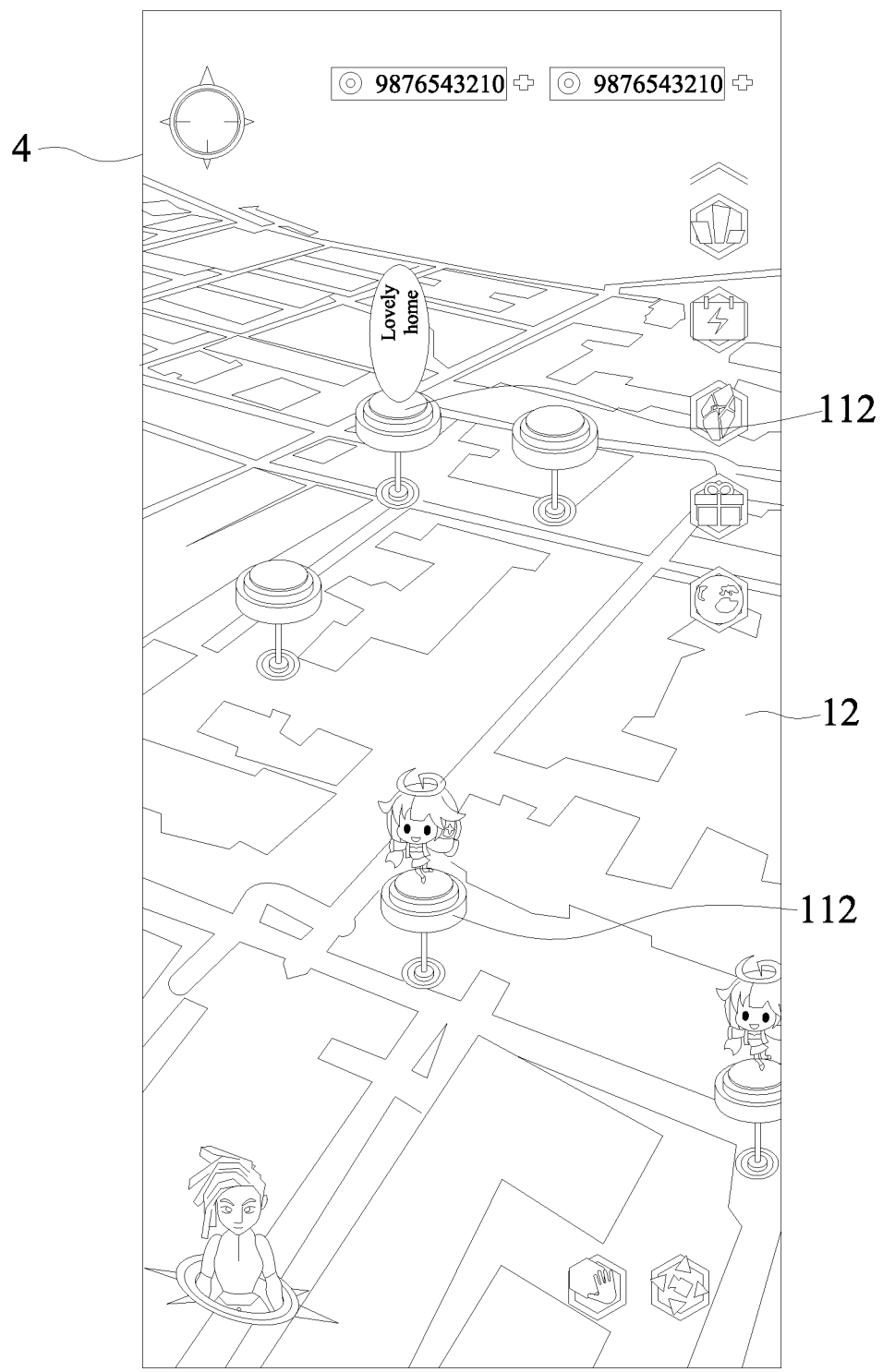
FIG. 9 is a schematic view of a portal world display page of the second preferred embodiment of this disclosure.

With reference to FIGS. 8 and 9 for the system functional block diagram of the operation structure and the portal world display page of the second preferred embodiment of this disclosure respectively, this disclosure provides a location-based metaverse social system combining the real world with virtual worlds for virtual reality interaction, provided for at least one user 7 to position by a mobile device 8 and then actually move to a location to carry out an online/offline interaction and various social events of virtual reality integration, and the system includes: a virtual world management processor 1 and a user processor 2. Wherein, the virtual world management processor 1 combines basic map information 9 of the real world to augment a portal world 4, and create a plurality of mutually parallel virtual worlds 10. In other words, the basic map information 9 of the real world at least includes various basic information labels of street or building, such as the map information of google map with similar attributes, and this system uses the basic map information 9 as a base, and further changes its location and content of the visual environmental performance or information quantity, so as to derive a "metaverse" model of the portal world 4. After the user 7 performs a site positioning at the corresponding mobile device 8, the user 7 can further carry out a subsequent location-based service (LBS) social event in the portal world 4.

Further, each of the virtual worlds 10 has a self-defined world title 11, and each virtual world 10 has display column information 111 corresponding to the world title 11 and the portal world 4 has a plurality of location point information 112, wherein each of the location point information 112 has a geographical parameter 1120. The location point information 112 can be understood as "the concept of a unit of "discussion thread" and the location point information 112 is provided for each user 7 to leave a message, paste a sticker, or place video information for various social interactions.

The world title 11 can be set as various attributes or connotations as required. Various virtual worlds 10 with superior/inferior connotations such as gourmet world, idol world, boutique world, sports world, 3C world, power machinery world, science fiction world, literary world, anime world, film world, animal world, insect world, cat world, eco world, etc. Taking the idol world for example, the display column information 111 of the corresponding world title 11 can use a design element related to one or more idols for the environment configuration. For example, in the virtual world 10 of the global idol group AKB48, the display column information 111 can be designed with an integral performance having a visual intuitive relevance with the clothing or album of the AKB48. In order to deepen the social interaction and stickiness between the users and each virtual world 10, the display column information 111 can be edited by the handler of the virtual world 10 to embed various static or dynamic electronic information such as photos, video streams, or text interactive information of bulletin board. Therefore, the interactivity between the fans and the idols can be improved, and the urge for the feeling similar to that being physically in contact with the idol can be satisfied.

On the other hand, the location point information 112 may be set as various information sites related to the world title 11 of each virtual world 10, such as the location point information 112 of the stores that sell the idols' or star players 'peripheral products, or the location point information 112 of a location where various purposeful activities such as fan club, autograph session, live concert, flash event, public welfare activity, agency publicity, etc. are carried out. When the user 7 moves to the location point information 112, the user 7 can carry out various social communication conducts of the corresponding online/offline interaction and virtual reality integration. It is noteworthy that the example above is provided for illustrating this disclosure only, but the world title 11 can also be set for various virtual worlds 10 with different superior/inferior performance.

Further, the user processor 2 is provided for the user 7 to create a personal account, and electrically connected to the virtual world management processor 1, and the user processor 2 includes: a virtual character creation processor 20 and a login processor 21. Wherein, the virtual character creation processor 20 is provided for creating a virtual character 201, and the virtual character 201 is tied with the personal account and displayed on the mobile device 8. The login processor 21 is provided for the user 7 to login the virtual world management processor 1 and login the personal account, and the virtual character 201 in the portal world 4 can be displaced synchronously with the movement of the user 7. When the user 7 moves to the location of the location point information 112, the user can read or write the content of the location point information 112 or update it to be the location-based social event. In other words, the movement of the user 7 in the real world represents that the virtual character 201 of the user 7 explores and finds various location point information 112 in the portal world 4 to carry out the location-based social interaction communication.

In particular, the user 7 can also freely switch from the portal world 4 to any one of the virtual worlds 10 to browse or edit the display column information 111 to carry out a social event, or can carry out a location-based social event at the location point information 112 of the portal world 4. If the activity initiated by the virtual world 10 is related to the location point information 112 of the portal world 4, the users 7 will need to participate with actual movement and travel through the portal world 4 and the virtual worlds 10. For example, the user 7 situated in the virtual world 10 which is an "idol world" participates in a favorite food collection activity initiated by an idol group, and the user 7 can move the location point information 112 of each specified gourmet in a location-based manner to complete an activity instruction for the virtual reality interaction. In addition, the "metaverse" model of this disclosure can add and post various location point information 112 of virtual reality integration continuously. In other words, virtual stores not existing in a real environment can be shown in the portal world 4, or building information of a location or perimeter the same as those in the real environment can be shown together, such as the location point information 112 of a flash event created at a perimeter location of an actual store. In order to enhance the versatility of the "metaverse" model and allow the user 7 to be more immersed in the virtual reality transition between the virtual worlds 10 and the real world, and the location point information 112 can be created by selecting a location by the user 7 after the portal world 4 moves. If the location point information 112 is created, the content of the location point information 112 will be written and updated, or if at least one mission is generated around the location point information 112 or the mission is completed, an "event" will be formed and recorded separately, and the "event" has a time parameter and the geographical parameter 1120 corresponding to the location point information 112. For example, when the user 7 leaves a message in any of the location point information 112, such conduct has significance in location and time. In other words, the conduct includes the geographical parameter 1120 of the location point information 112 and the time parameter for generating and defining an "event". Regardless of being an online virtual site, or presented in conjunction with a physical site, the location point information 112 can have a perimeter to be set for various small games to enhance the social interaction such as fighting with monsters, hunting for treasure, limited activity, AR interaction, and various missions in a game for the user 7, and the execution of these missions will generate an "event". In summation, this disclosure combines the crowd gathering of the actual offline location and the online virtual social group by a composite interest map, such as each parallel virtual world 10 with the interest of gourmet, music, home stuff, etc. as the theme, to allow various different users 7 with diverse interests to carry out a social communication with like-minded partners.

On the other hand, each virtual world 10 is composed of a base block 101 and at least one adjacently arranged territory block 102, and the base block 101 is provided for displaying the display column information 111, and the territory block 102 points at the geographical location of the portal world 4; after the users 7 enter into any one of the virtual worlds 10, the users 7 can move in the base block 101 and the territory block 102 and browse or edit the display column information 111 in the base block 101 to carry out a social event, or quickly transfer from the territory block 102 to the geographical location of the corresponding portal world 4, so as to participate in various activities of each of the location point information 112. Therefore, each user can further browse or edit the display column information 111 displayed in the base block 101 to carry out a social event according to the followers of different types or the virtual worlds 10 of interest. For example, messages are left at the location of a bulletin board of the display column information 111 of the virtual world 10, or the information of the user 7 with better interaction or higher access frequency such as the photos of the user 7 or the video streams produced by the representative idol of the virtual world 10 and performed for the user 7 is posted by the handler of the virtual world 10, so that the social stickiness of each user 7 with the virtual world 10 can be improved significantly; and each user 7 is motivated to participate in various activities held by the virtual world 10 and improve the positive participation of the virtual world 10 that the user 7 follows. This social interaction model is completely different from the conventional social interaction model in the past where the interaction of social software is too monotonous, the interactivity is low, or the followers are too cold and the number of subscriptions information is too small.

Figure 10:
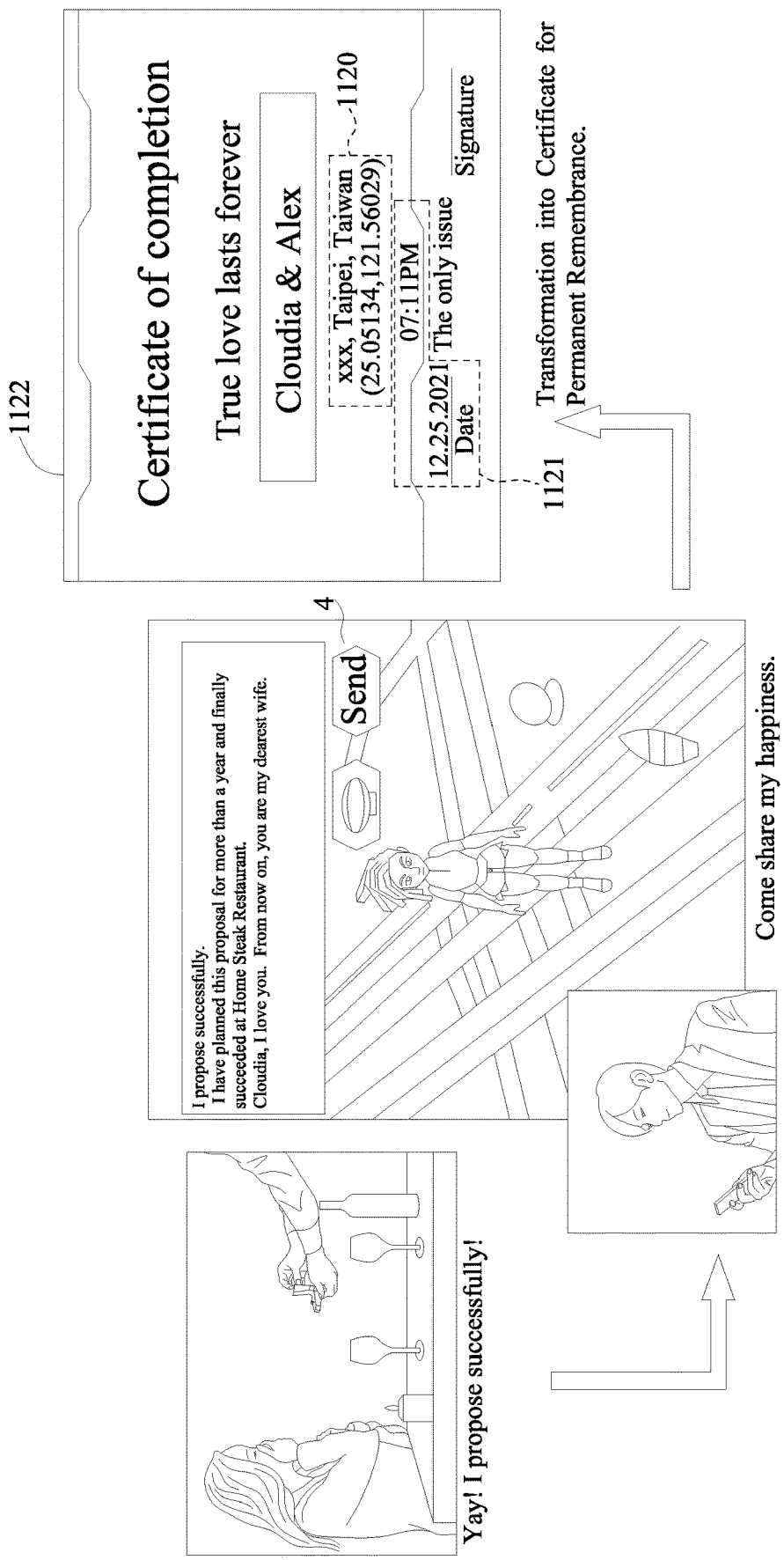
FIG. 10 is a schematic view of converting an "event" to generate a NFT digital product in accordance with the second preferred embodiment of this disclosure.

In FIGS. 8, 9 and 10, FIG. 10 is a schematic view showing the conversion of an "event" to generate a NFT digital product in accordance with the second preferred embodiment of this disclosure. In many conventional games in the past, it is common to have the concepts of virtual product, treasure or equipment. However, the virtual products only exist in the game, and will be lost after the game is over. In addition, the virtual product usually has no economic value or unique specialty. Even if there are commercial transactions, they are mostly economic activities privately exchanged between players, rather than strict supporting measures. In the area of trading digital products, a non-fungible token (NFT) is introduced, and NFT is a unique digital identifier representing a certain unique matter or unique digital property, NFTs are not mutually interchangeable and can be used as an alternative representation from digital products such as the objects in the virtual world to physical assets. In order to maintain the security of this digital product, promote its credibility and ensure its value, the blockchain technology is adopted to record the NFT in a blockchain. Since the blockchain technology has the feature of distributed storage which is related to the decentralized storage method and distributed algorithm, therefore no one can change the data on the network at will, thus eliminating the possibility of human manipulation and modification. In other words, once a record of data is written, it cannot be changed. Once the data is authenticated, it is permanently written into the block. This special algorithm using a one-to-one correspondence function to ensure that the data is not tampered, so that the ownership of these assets is recorded by the chainblock of the block chain technology and can be circulated. In the past, most NFTs were conducted in the form of "product digitization" such as painting, music, film, player card, virtual treasure, etc., but unlike the related art, this disclosure adopts the concept of "event" for creating the digital products with "memory" and "commemoration" as the main body; such as live concert, party, date, or ball game, etc. Therefore, this disclosure can add a 3D-geographical element and a 4D-time element to generate a NFT digital product according to one of the events or a combination of two or more "events". After the NFT digital product is added, the significance of the NFT digital product at the "location" is improved to give the meaning to the coordinates in the 3D space, and add the mark of the NFT digital product on the "time" to mark the scale position on the 4D time. Therefore, the group has a common memory attribute and the reputation recognized by the public, and also has general values to present glory or privileged "events" to be commercialized; or a personal collection memory attribute that commercialize an "event" of a high commemoration collection value for personal activities with special meaning.

In an example as shown in FIG. 10, "Alex" proposes to "Cloudia" in a restaurant at a certain location of the location point information 112 in one of the virtual worlds 10. Since the "event" has the time parameter 1121 and the geographical parameter 1120 corresponding to the location point information 112, therefore it is exciting that when "Alex" successfully proposes to "Cloudia" and wants to keep the moment worthy of remembrance, the "event" in this system can be converted to generate a NFT digital product, such as a digital certificate 1122. In another example, an NBA star player sets a historical record on a certain day at a certain place, an "event" is generated according to the time parameter 1121 and the geographical parameter 1120 to generate various NFT digital products related to the "event" based on these perimeters, and the users 7 need to make a location-based movement to the place and participate in the ball game at the time parameter, before having the chance of obtaining the NFT digital product issued based on the record-breaking date and place. In another example, a live concert is held by a certain idol at a certain time and a certain place, and the live concert has a special event such as "Guessing the song performed in the live concert" mission, and gives a limited edition of the NFT digital product certificate with the highest-level fans certification to the user 7 who has completed the mission. In the future, the user 7 who owns the NFT digital product certificate can obtain the exclusive gift provided by the idol through the virtual reality integration.

Since the NFT digital product provides the ownership record through the blockchain technology, the NFT digital products have the characteristics of decentralization, non-tampering, and traceability, etc. to ensure that the unique specialty and economic value of the NFT products. Further, in order to make the NFT product closer to the usage impression of virtual reality integration, the attributes of some of the NFT digital products such as a player card, a license, a coupon, a membership card and various certificates are visibility data that can be displayed through the mobile device 8; or the NFT digital products are visibility data of the clothing and accessories of the virtual character 201, and the NFT digital products can be worn on the virtual character 201. Visibility data can satisfy the sense of glory of each user 7, such as wearing unique clothing and accessories on the virtual character 201 and displaying them, for online/offline virtual reality integration merchants or activities and other fields, for various certificates of special identities to serve as identification, and the visibility data is conducive to the improvement of trading liquidity.

In order to facilitate the trading and circulation of the NFT digital products, the virtual world management processor 1 further issues a cross-border currency which can be circulated and used in each virtual world 10 for trading the NFT digital product; and the location point information 112 in the portal world 4 includes at least one NFT trader, provided for the user 7 to trade the NFT digital product by the NFT trader. Wherein, the cross-border currency can be obtained by recharge or can be obtained after completing the mission generated around the location point information 112. Of course, the cross-border currency issued in accordance with this disclosure can be recorded in blockchains through the block chain technology to improve the circulation reliability and security of the cross-border currency, so that various virtual products recorded by blockchains have high security and tradability, and the NFT trader sets an auction mechanism to allow the users 7 to sell their own NFT digital products. Once the NFT digital product is available for trading, it has the advantages of: 1. maintaining liquidity, and maintaining product exposure and topicality; 2. creating product value-added space by free bids; 3. promoting communication and competition between players/fans, which can greatly promote social interaction between the users 7. As described above, "the location point information 112 can have a perimeter to be set for various small games such as fighting with monsters, hunting for treasure, limited activity, AR interaction, and various missions in a game for the user 7", and thus the currency can be issued in the same way as the GameFi, after the mission generated around the location point information 112 is completed. The NFT trader can be attached to a physical store in the virtual reality integration manner and created and displayed on the portal world 4; or just virtually created without a corresponding physical store. These two implementation methods are appropriate practices, and of course, virtual flash stores derived from this base are also appropriate examples.

Figure 11A:
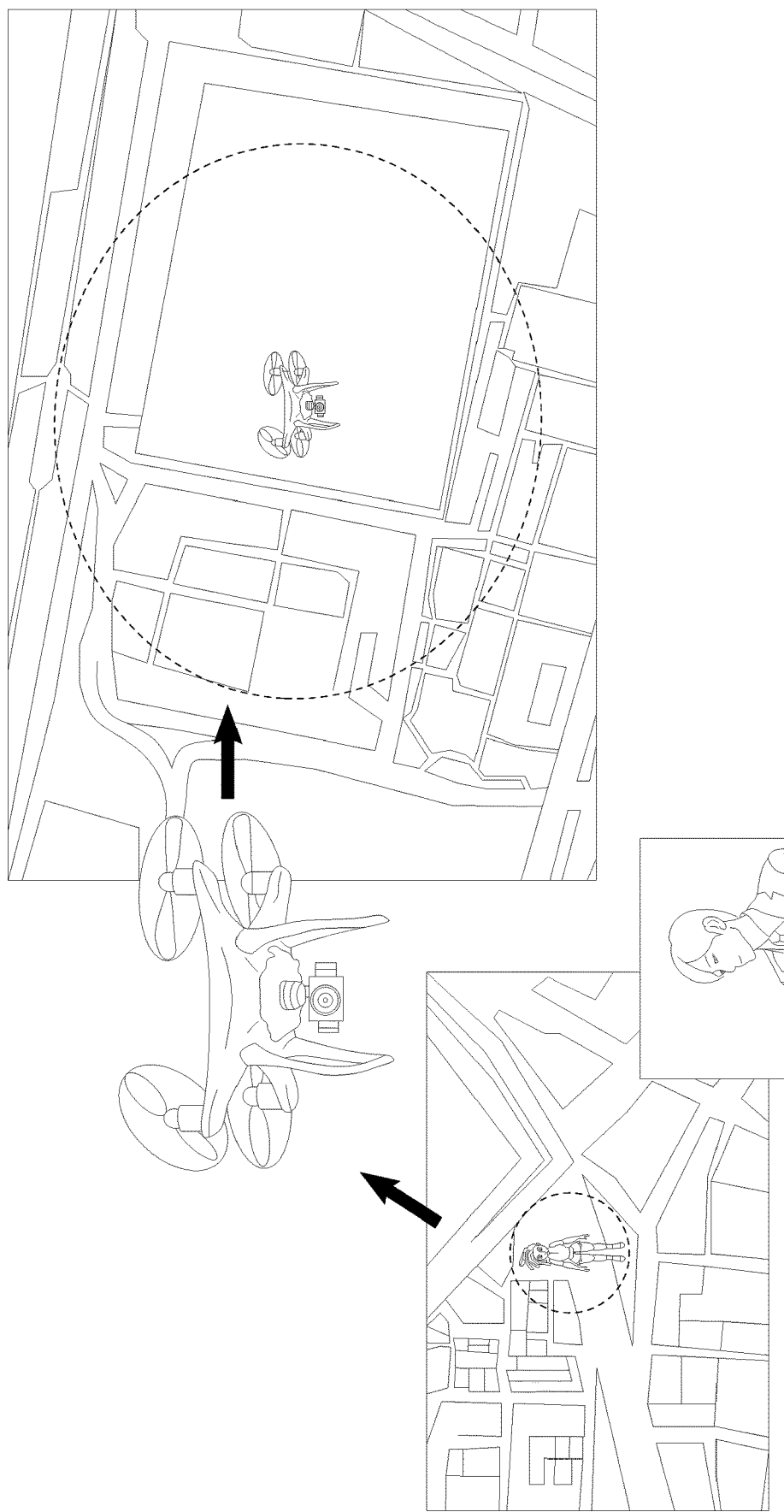
FIG. 11A is a schematic view of executing a "drone mode" to augment a location-based service positioning point location in accordance with the second preferred embodiment of this disclosure.
Figure 11B:
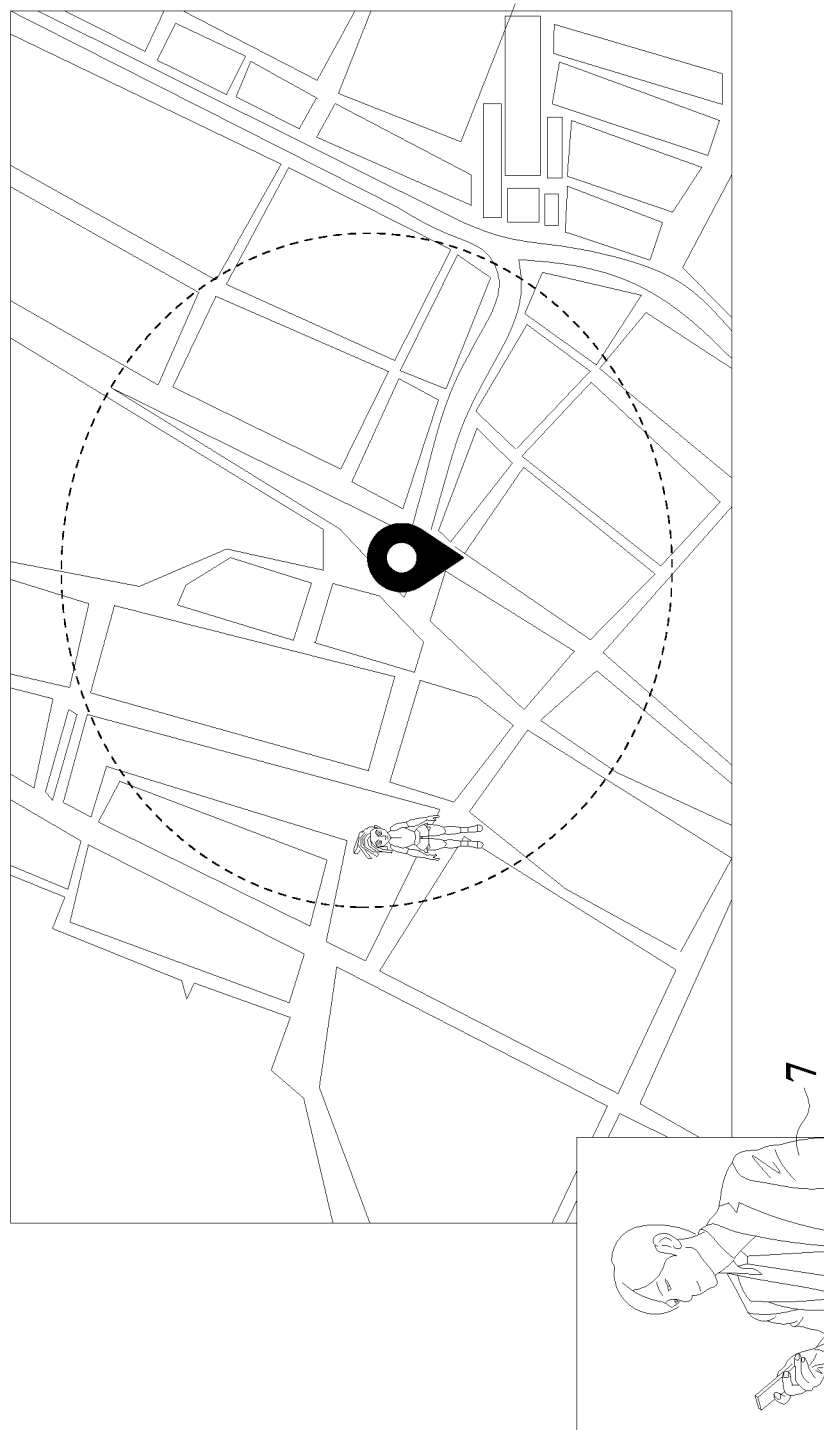
FIG. 11B is a schematic view of executing a "cruise mode" to augment a location-based service positioning point location in accordance with the second preferred embodiment of this disclosure.
Figure 11C:
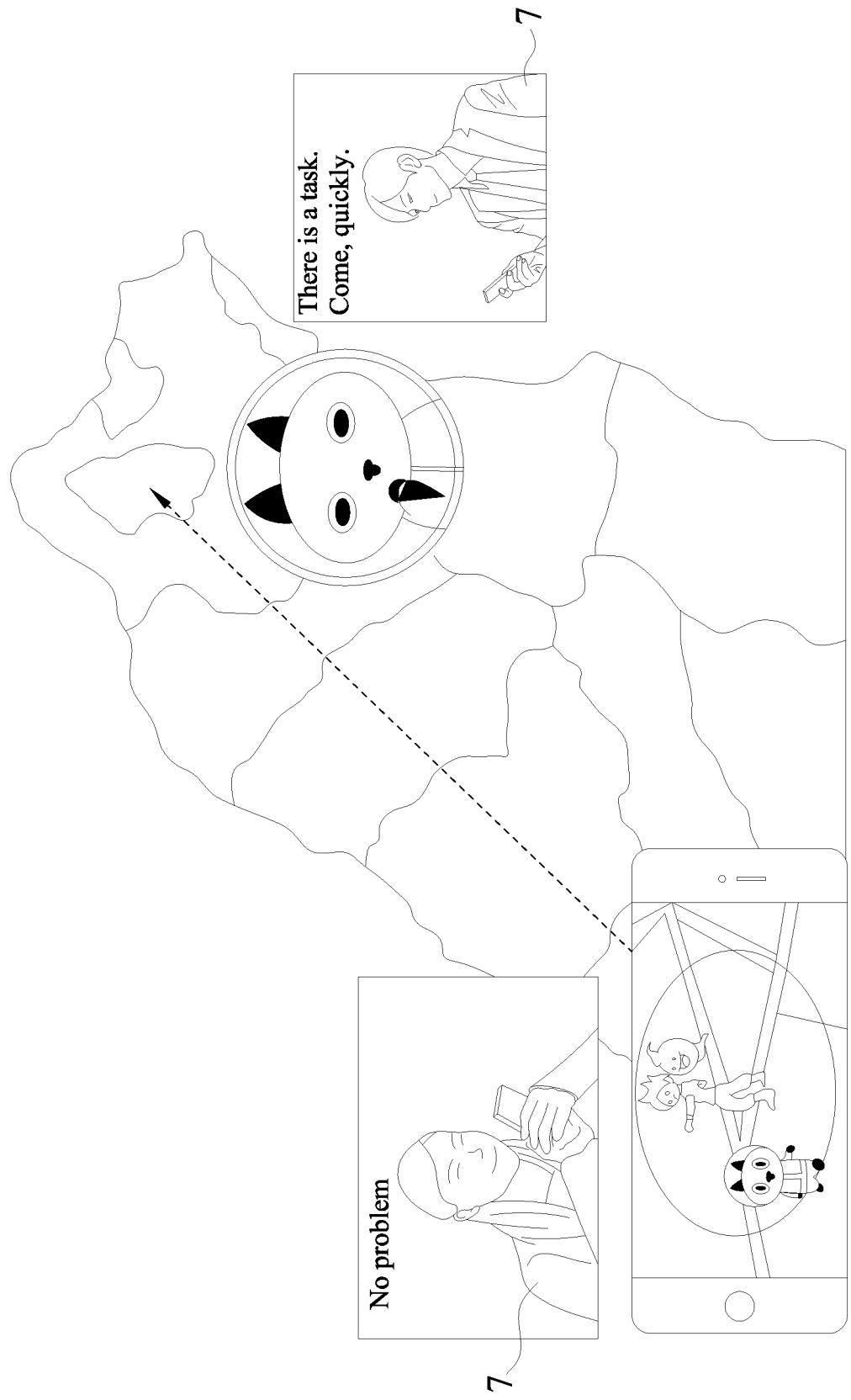
FIG. 11C is a schematic view of executing a "summon mode" to augment a location-based service positioning point location in accordance with the second preferred embodiment of this disclosure.
Figure 12:
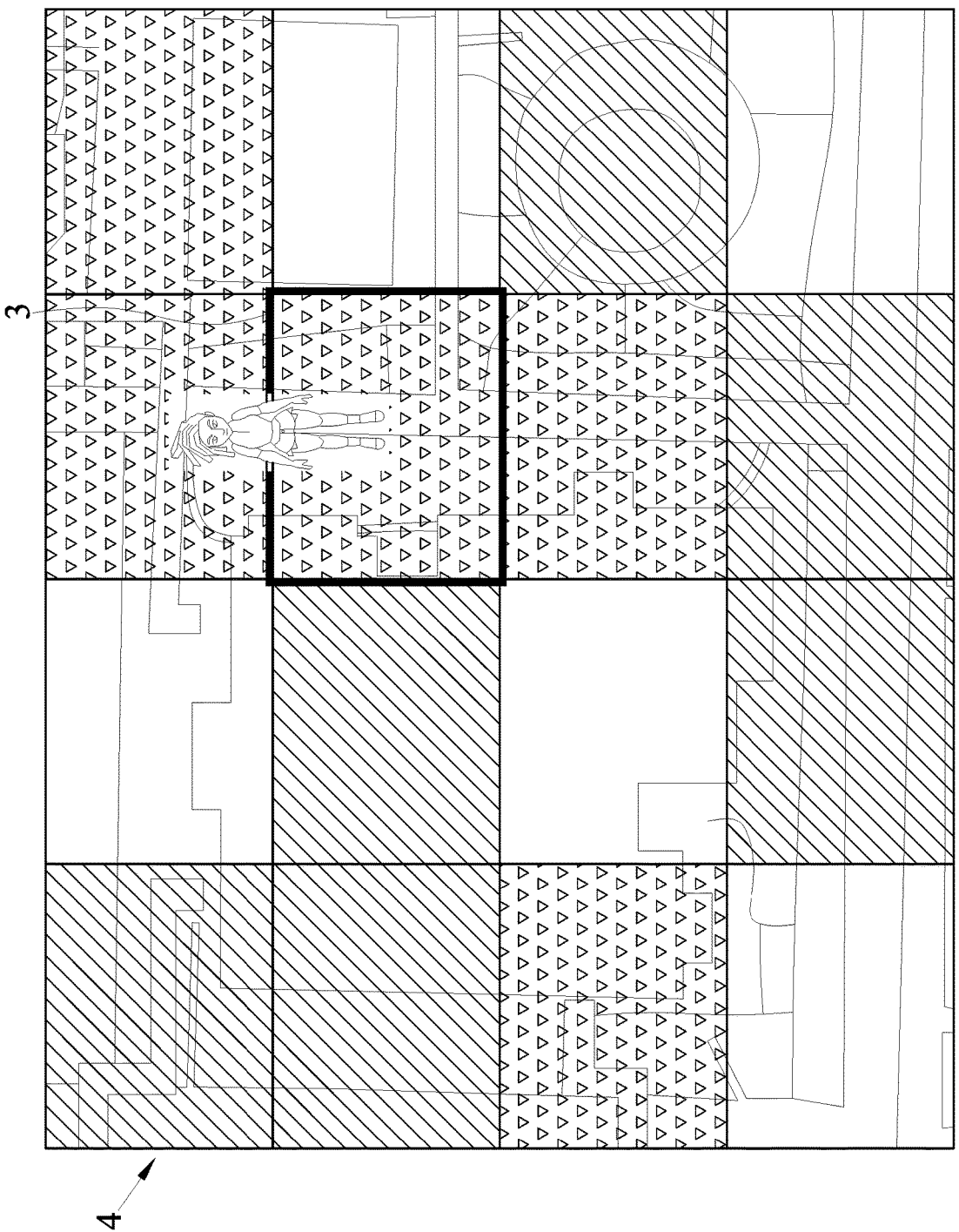
FIG. 12 is a schematic view showing a land occupancy page of the second preferred embodiment of this disclosure.

With reference to FIGS. 8-10, 11A, 11B and 11C, FIGS. 11A, 11B and 11C are the schematic views of the locations of the location-based service positioning point executed under the "drone mode", "cruise mode" and "summon mode" in accordance with the second preferred embodiment of this disclosure respectively. The advantages of traditional location-based services are that they have the characteristics of regional attribute, location guidance, personal participation, and integration of reality and virtuality. On the other hand, they have the disadvantages of regional restrictions, forced displacement, and monotonous repeatability of non-migrating players. In order to improve the diversity of location-based services, the system of this disclosure as shown in FIG. 11A further includes a remote range for the user 7 to execute a drone mode within a limited time to move to a location where the user 7 is not situated. For example, the drone props shown on the portal world 4 can be moved and projected to the location of a remote map after executing the drone mode, and the location can be viewed in a short time, such as performing various missions including playing random games, fighting with monsters, leaving messages, carrying out an activity or obtaining the information. In FIG. 11B, the system of this disclosure further includes a patrol range for the user 7 to execute a cruise mode to move in the patrol range extending around the user's location, and allow the user 7 to perform various missions including playing random games, fighting with monsters, leaving messages, carrying out an activity or obtaining the information within the patrol range without moving the actual location. In FIG. 11C, the system of this disclosure further includes a summon mode executed by another user 7, such that the called user 7 moves to the location of the user 7 executing the summon mode, and the user 7 can participate in the missions generated by the location point information 112 around the location where the user is not situated without requiring the user to actually move to such location and can bring the online friends to the location to share the fun of various limited missions at that location.

With reference to FIGS. 8-12, FIG. 12 is a schematic view of a land occupancy page in accordance with the second preferred embodiment. The portal world 4 is divided into a plurality of land blocks 3 to further improve the social interaction among the users 7, and the user 7 can select an "attribute" to move and go the land block 3, and then occupy the land block 3 based on a land occupancy chip possessed by the user 7, and obtain a reward value after occupying the land block 3, wherein the movement of the user 7 can be actual movement, and then the user executes the drone mode or the cruise mode or receives the summon mode of the other user 7 to go to the land blocks 3; if two or more users 7 compete for the ownership of occupation of the land block 3, the users 7 will be divided into groups according to their "attribute", and the group having a greater number of the total number of land occupancy chips will be determined to occupy the land block 3 and obtain the reward value, and the reward value is allocated in proportion to the land occupancy chips invested by the users 7 occupying the land block 3, wherein the reward value can be converted into the cross-border currency. In an exemplary embodiment, a land occupancy chip can be used in various game to obtain an occupancy value, and after the game is completed, the occupancy value is determined whether or not it exceeds a predetermined value to decide whether not to meet an occupancy condition; or further compare with the occupancy value of each attribute group to determine the ownership of occupancy of the land block 3. Wherein, the "attribute" can be understood as a corresponding follower for an idol or the same topic, so that the cohesion between fans or groups can be strengthened by the land occupation competition system, and at the same time, like-minded partners can increase the number of groups of their social friends to expand and extend the entire social connection. On the other hand, the quantity of territory blocks 102 can be supplemented with the number of subscriptions of the base block 101 or the extent of followers to intuitively express the social charm index of the virtual world 10. Further, the land occupancy activity can be combined with the expansion of the territory blocks 102. In other words, the followers in a certain activity of the portal world 4 can be led by a leader of each virtual world 10 to carry out land occupancy, attack and defence, and a final winner of the land occupancy is determined by the system, and the information corresponding to the land block 3 of the portal world 4 is mapped to the location of the territory block 102 adjacent to the base block 101 of the virtual world 10 belonged to the winner, and the larger the number of territory blocks 102 adjacent to any of the base blocks 101, the higher the corresponding social charm index.

To improve interactive entertainment, the handler of the virtual world 10 can also put a decorative object in the territory block 102, and the decorative object includes various embedded static or dynamic electronic information such as photos, video streams, or objects with text interactive information, and the territory block 102 with the decorative object can be mapped to the location of the corresponding land block 3 in the portal world 4, and when each user 7 moves to the portal world 4, not just allowing the users to directly know each land block 3 belonging to which virtual world 10, and embed various electronic information to edit the territory block 102, and then map the edited appearance of the territory block 102 to the corresponding land block 3, so as to increase the fun of competition. For example, in the virtual world 10 of the global idol group AKB48, the handler of the virtual world 10 can put a billboard object of an AKB48 promotional poster in the territory block 102, and the billboard will be mapped to the location of the corresponding land block 3 of the portal world 4, and when each user 7 moves to the corresponding land block 3 of the portal world 4, the user can see that the land block 3 has the embedded billboard object of the AKB48 promotional poster.

The aforementioned cross-border currency of the virtual worlds 10 can be used to buy the NFT digital product, and the cross-border currency obtained after completing a mission, a recharge or a land occupancy event can also be used to buy at least one digital coupon issued by the virtual world management processor 1 in each online virtual world 10. For example, when consuming in a physical store, the mobile device 8 can be used as a digital coupon for discount or exchange in order to enhance the mutual stickiness of online and offline consumption behavior. To improve the participation of each user 7, the user 7 can obtain a contribution value after at least one of the events is executed at the portal world 4, and leaderboard information is generated based on the total of contribution values of two or more users 7. Of course, the leaderboard information can be used for a social interaction of healthy competitions similarly, and once a person who has achieved a better ranking in the leaderboard information, the system can also provide rewards such as the corresponding cross-border currency or the special NFT digital product to encourage each user 7 to actively take part of the social participation of the virtual worlds 10.

Figure 13:
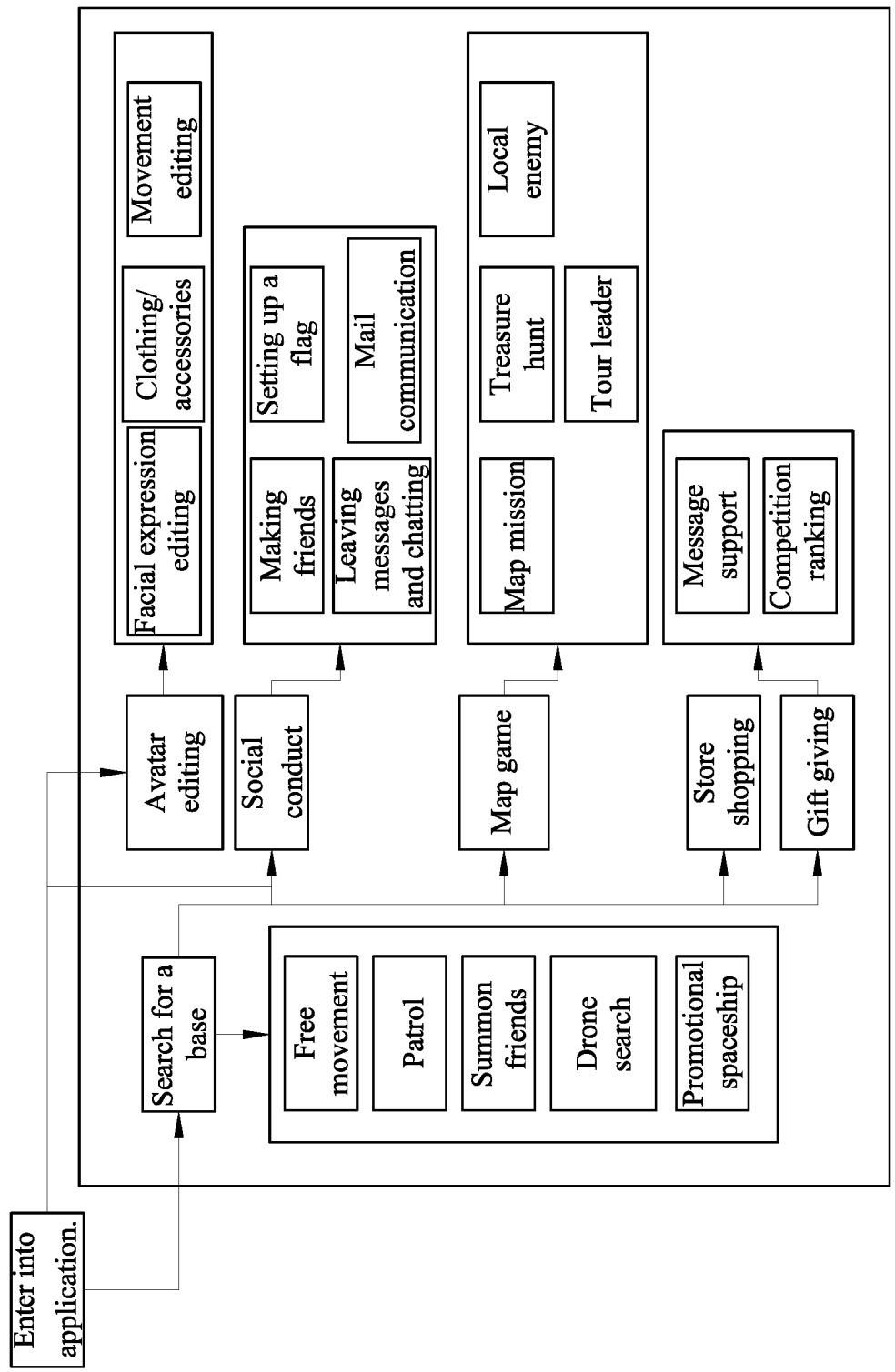
FIG. 13 is a block diagram showing the operation cycle structure of a user in a social media system of the second preferred embodiment of this disclosure.
Figure 14:
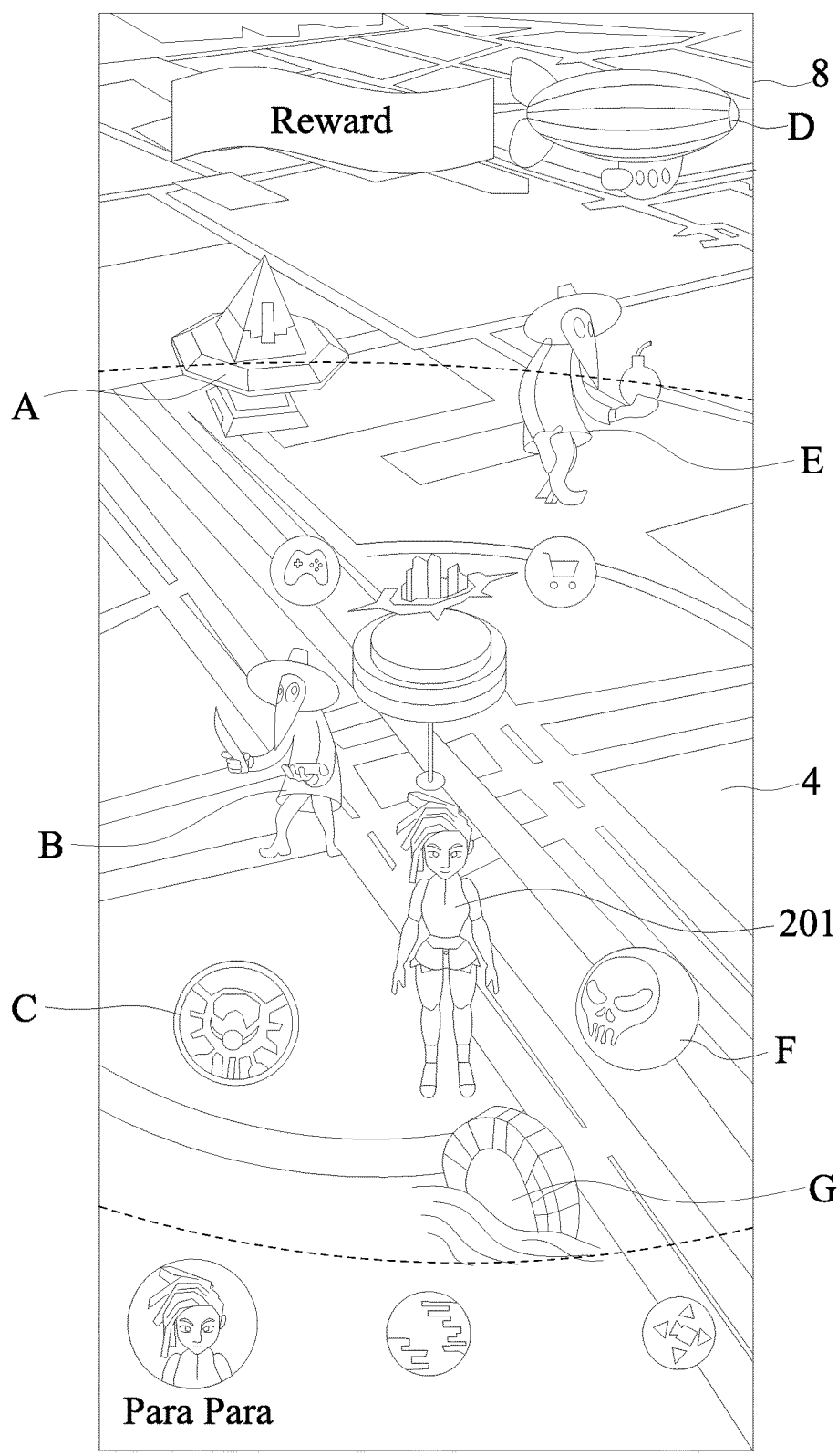
FIG. 14 is a schematic view of executing a display page of the second preferred embodiment of this disclosure.

With reference to FIGS. 8-14, FIG. 13 is the block diagram showing the operation cycle structure of a user in a social media system of the second preferred embodiment of this disclosure and FIG. 14 is the schematic view of executing a display page of the second preferred embodiment of this disclosure. In FIGS. 13 and 14, after the user 7 enters into this system, the corresponding application page can be displayed on the mobile device 8, and a personal account can be created by the user processor 2, and an Avatar can be edited to create its corresponding virtual character 201, and the details such as the facial expression, clothing/accessories, or movement, can be edited. After the virtual character 201 corresponding to the personal account has been created, the user can enter into the application page to select the corresponding virtual world 10 to carry out a social event, such as finding the attribute on the portal world 4 as the location point information 112 of a "base" A. Wherein, the "base" A defined in this disclosure refers to the recommended site/gourmet site/store site/official site built by the system of this disclosure and provided for the user 7 to use the "base" A as a unit of "a discussion thread", and a carrier for leaving messages and interacting on the "base" A. The way of finding and contacting the "base" A is through free movement, cruise mode, summon mode, or drone mode. The self-defined "promotional spaceship" D described in this disclosure refers to the propaganda currently displayed on the display page showing where there is special activity information and provided for the user 7 to transfer and move to the location after clicking the "promotional spaceship" D. Once again, it is noteworthy that the examples given above are some appropriate examples for illustrating this disclosure only and many other ways of finding the "base" A can be derived or expanded. After the user 7 has found the "base" A, the user can perform a social event such as social conduct, map game, shopping, gift giving, etc., wherein the social conduct can be making friends, leaving messages and chatting, communicating via mail, or "setting up a flag" self-defined by this disclosure, and the so-called "setting up a flag" refers to the action taken by the user 7 to select a location on the portal world 4 and build a temporary "base" A, and the attribute is a carrier provided for the user to leave a message for discussion, and it is only functioned in some with a mission derivation chance lower than that of the "base" A. Once the social conduct "setting up a flag" is completed, the user 7 can file an application to the system administrator for the examination to change to the "base" A, so as to obtain a long-lasting and functional point of use. In addition, the map game, includes "map mission" F, "treasure hunt" to find "local specialty" C, or a battle game with a "local enemy" E and a "tour leader" B. For shopping, an online transaction can be done when the page of the portal world 4 shows an icon of "store" G. As to gift giving, it includes message support or competitive ranking, that is the user 7 can "set up a flag" in the "base" A of the favorite idol/store or giving a gift giving to the favorite idol/store which represent the support to the idol/store, and the income of the gift will also be split and transferred to the idol/store. As to the attribute, the gift also represents a string of messages, so that the user 7 sending a gift can leave a message to the idol, and the gift in each block has a leaderboard, so that the more gift the user 7 gives, the higher the ranking of the user 7. In this way, the name and message of the user 7 has a better chance of being noticed by the idol. It is noteworthy that the "setting up a flag", and "base" are substantially location point information 112, and the "map mission", "treasure hunt" for searching for "local specialty" C, or playing a battle game with the "local enemy" E and the "tour leader" B are the "mission" attribute, and the specific description above is only one of the implementation modes of this system, but not the only expression or action rule of this system.

In summation of the description above, this disclosure is different from various electronic bulletin boards, theme boards, discussion threads, merchant website's static information; and Facebook, Twitter, IG, and other similar social platforms or software functions traditionally presented in text form, but this disclosure uses the "metaverse" virtual world concept instead to create various parallel theme worlds combined with location-based service technology for users to locate through mobile devices, and supplemented by actual actions to carry out social events across the world with online/offline interaction and virtual reality integration. In this way, this disclosure expresses various themes such as various target including brand, merchant, agency, corporation, event, idol or channel operation various by the concept of parallel virtual worlds and cross-border visits, together the self-created location point information and environment skin configuration function, to enhance the personalized performance of the theme world. In addition, the location-based service and the NFT digital product technology generated by the concept of "event" concept together with the functions of land occupancy activity, various games and virtual cross-border currency, etc. are used to allow different point locations of online/offline merchants to greatly improve the user stickiness, so as to deepen the social interactivity of the users and provide better immersive experience to improve their loyalty and retention. In the meantime, in order to increase the fun of competition, the land block will be projected to adjacent to the base block similar to the territory expansion concept to form a territory block after the user puts up the effort to successfully occupy the land block, and the user can further map to the land block to edit the visual decoration of the territory block, so as to satisfy the active participation of the users. Therefore, this disclosure is indeed different from the conventional technology and is a novel virtual reality integration social interaction system.

What is claimed is:

1. A location-based metaverse social system combining a real world with virtual worlds for virtual reality interaction, provided for at least one user to move and carry out various social events of online/offline interactions after positioning through a mobile device, comprising:
    a virtual world management processor, for augmenting the virtual worlds by basic map information of the real world, wherein each of the virtual worlds comprises a world title, which is self-defined, and a virtual map corresponding to each respective virtual world, and each world title has corresponding environment skin information and a plurality of location point information, and the location point information has a geographical parameter; and the virtual maps are combined with the basic map information and generated based on the environment skin information and the location point information of the world title; and
    a user processor, provided for the user to create a personal account, and the user processor electrically coupled to the virtual world management processor, comprising:
    a virtual character creation processor, provided for creating a virtual character, and being tied with the personal account and displayed on the mobile device; and
    a login processor, provided for the user to login the virtual world management processor by the personal account, and select one of the virtual worlds to synchronously displace the virtual character in the virtual map of the selected virtual world, such that when the user moves to the location of the location point information, content of the location point information is readable, writeable, or updateable by the user for a location-based social event;
    wherein, the user is capable of switching to the virtual map of any one of the virtual worlds, and then carry out the location-based social event based on the location point information existed in each corresponding virtual map, and the location point information is settable by the user by selecting a position after moving on each virtual map; when the location point information is created and set, the content of the location point information is written and updated, or when at least one mission is produced by the location point information or the mission is completed, the formation of an event is recorded, and the event has a time parameter and the geographical parameter corresponding to the location point information.

2. The location-based metaverse social system according to claim 1, wherein the location point information of any one of the virtual maps is broadcastable to other virtual maps having the location point information with the same geographical parameter.

3. The location-based metaverse social system according to claim 1, wherein a NFT digital product is generated according to one of the events or combination of two or more of the events; and the virtual world management processor further issues a cross-border currency which is circulatable in each of the virtual worlds and used for trading the NFT digital product, and the cross-border currency is obtainable by value recharging or completing the mission generated around by the location point information.

4. The location-based metaverse social system according to claim 3, wherein the location point information in the virtual maps comprises at least one NFT trader provided for the user to trade the NFT digital product at the NFT trader.

5. The location-based metaverse social system according to claim 4, wherein the NFT digital product is visibility data displayed through the mobile device.

6. The location-based metaverse social system according to claim 5, wherein the NFT digital product is visibility data of wearing accessories of the virtual character, and the NFT digital product is wearable on the virtual character.

7. The location-based metaverse social system according to claim 3, further comprising a remote range in which the user executes a drone mode within a limited time to move to a location where the user is not situated; or a patrol range in which the user executes a cruise mode to move in the patrol range extending around the user's location; or a summon mode executed by another user, such that the user being called moves to the location of the user executing the summon mode, and the missions participable by the user are generated by the location point information around the location where the user is not situated without requiring the user to move to said position.

8. The location-based metaverse social system according to claim 7, wherein one of the virtual worlds is defined as a public world, and the virtual map of the public world is divided into a plurality of land blocks, and an attribute is selectable by the user to move to a land block, execute the drone mode or the cruise mode, or receive the summon mode executed by other user before going to the land block, and then occupy the land block according to the a land occupancy chip possessed by the user, and obtain a reward value after occupying the land block; if two or more users compete for ownership of occupation of the land block, the users will be grouped individually according to the attribute they selected, and group having a greater number of the total number of land occupancy chips will be determined to occupy the land block and obtain the reward value, and the reward value will be distributed according to the proportion of the land occupancy chips put in by the users who occupy the land block, wherein the reward value is convertible into the cross-border currency.

9. The location-based metaverse social system according to claim 8, wherein the virtual world management processor further issues at least one digital coupon at each of the virtual worlds online, and the cross-border currency is usable for buying the digital coupon, and the digital coupon is usable for trading in a physical store offline.

10. The location-based metaverse social system according to claim 3, wherein the user obtains a contribution value after executing at least one of the events in each of the virtual worlds, and total of the contribution values of two or more users is used for generating leaderboard information.

11. A location-based metaverse social system combining a real world with virtual worlds for virtual reality interaction, provided for at least one user to move and carry out various social events of online/offline interactions after positioning through a mobile device, comprising:
    a virtual world management processor, for combining basic map information of the real world to augment a portal world, and creating the virtual worlds parallel to each other, and each of the virtual worlds comprising a world title, which is self-defined, and each of the virtual worlds having display column information corresponding to the world title, and the portal world having a plurality of location point information, and each of the location point information having a geographical parameter; wherein, each of the virtual worlds comprises a base block and at least one territory block adjacent to the base block, and the base block is provided for showing the display column information, and the territory block points at geographical location of the portal world; after the user enters into any one of the virtual worlds, the user is capable of moving between the base block and the territory block, and browse or edit the display column information in the base block to carry out the various social events, or quickly transfer from the territory block to the geographical location in the portal world correspondingly; and a user processor, provided for the user to create a personal account, and electrically coupled to the virtual world management processor, comprising:

a virtual character creation processor, provided for creating a virtual character, wherein the virtual character and the personal account are tied with each other and displayed on the mobile device; and a login processor, provided for the user to login the virtual world management processor by the personal account, and synchronously displace the virtual character in the portal world with the movement of the user, and when the user moves to location of the location point information, content of the location point information is readable, writeable, or updateable by the user for a location-based social event;

wherein, the user is capable of switching from the portal world to any one of the virtual worlds to browse or edit the display column information to carry out the various social events.

12. The location-based metaverse social system according to claim 11, wherein the location point information is creatable by the user by selecting a location after moving in the portal world, and when the location point information is created, the content of the location point information is written and updated, or at least one mission is generated around the location point information or the mission is completed, an event will be recorded respectively, and the event comprises a time parameter and the geographical parameter corresponding to the location point information.

13. The location-based metaverse social system according to claim 12, wherein a NFT digital product is generated according to one of the events or a combination of two or more of the events; and the virtual world management processor further issues a cross-border currency which is circulatable in each of the virtual worlds and used for trading the NFT digital product; and the cross-border currency is obtainable by recharge or obtained by completing the mission generated around the location point information.

14. The location-based metaverse social system according to claim 13, wherein the NFT digital product is visibility data displayed through the mobile device.

15. The location-based metaverse social system according to claim 14, wherein the NFT digital product is visibility data of a wearing accessory of the virtual character, and the NFT digital product is wearable on the virtual character.

16. The location-based metaverse social system according to claim 12, further comprising a remote range for the user to execute a drone mode within a limited time and move to a location where the user is not situated; or a patrol range for the user to execute a cruise mode and move in the patrol range extending around the user's location, or a summon mode executed by another user to move the user being called to the user location where the summon mode is executed, such that the mission participable by the user are generated around the location point information at a location where the user is not situated without the need of moving to said location.

17. The location-based metaverse social system according to claim 16, wherein the portal world is divided into a plurality of land blocks, and an attribute is selectable by the user to move to one of the land blocks, and then occupy the land block based on a land occupancy chip possessed by the user and obtain a reward value after occupying the land block; if two or more users compete for the ownership of occupation of the land block, the users are divided into groups according to the attribute selected by each user respectively, and then the group having a larger total number of the land occupancy chips is determined to occupy the land block and obtain the reward value, and the reward value is allocated in proportion to the land occupancy chips invested by the users occupying the land block, and the reward value is convertible into the cross-border currency.

18. The location-based metaverse social system according to claim 17, wherein after the land block is occupied, the territory block is formed by mapping the land block that is occupied to adjacent to the base block of the users that has right to occupy, and the territory block is embeddable into various static or dynamic electronic information and mapped to the land block correspondingly for display.

19. The location-based metaverse social system according to claim 18, wherein the virtual world management processor further issues at least one digital coupon for each of the virtual worlds online, and the cross-border currency is provided for buying the digital coupon, and the digital coupon is usable for trading in a physical store offline.

20. The location-based metaverse social system according to claim 12, wherein the user obtains a contribution value after the user executes at least one of the event in the portal world, and total of the contribution values of two or more users is provided for generating leaderboard information.

21. The location-based metaverse social system according to claim 11, wherein the portal world is divided into a plurality of land blocks, and an attribute is selectable by the user to move to one of the land blocks, and then occupy the land block based on a land occupancy chip possessed by the user and obtain a reward value after occupying the land block; if two or more users compete for the ownership of occupation of the land block, the users are divided into groups according to the attribute selected by each user respectively, and then the group having a larger total number of the land occupancy chips is determined to occupy the land block and obtain the reward value, and the reward value is allocated in proportion to the land occupancy chips invested by the users occupying the land block, and the reward value is convertible into the cross-border currency.

22. The location-based metaverse social system according to claim 21, wherein after the land block is occupied, the territory block is formed by mapping the land block that is occupied to adjacent to the base block of the users that has right to occupy, and the territory block is embeddable into various static or dynamic electronic information and mapped to the land block correspondingly for display.

23. The location-based metaverse social system according to claim 22, wherein the virtual world management processor further issues at least one digital coupon for each of the virtual worlds online, and the cross-border currency is provided for buying the digital coupon, and the digital coupon is usable for trading in a physical store offline.

* * * * *